(12) United States Patent
Peng et al.

(10) Patent No.: US 12,333,263 B2
(45) Date of Patent: Jun. 17, 2025

(54) CONTENT TRANSLATION METHOD AND TERMINAL

(71) Applicant: Huawei Technologies Co., Ltd., Shenzhen (CN)

(72) Inventors: Yong Peng, Shenzhen (CN); Wenjun Lu, Shanghai (CN); Yujie Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 866 days.

(21) Appl. No.: 17/515,798

(22) Filed: Nov. 1, 2021

(65) Prior Publication Data
US 2022/0050975 A1 Feb. 17, 2022

Related U.S. Application Data

(63) Continuation of application No. PCT/CN2020/086004, filed on Apr. 22, 2020.

(30) Foreign Application Priority Data

Apr. 30, 2019 (CN) .......................... 201910364974.0
Jun. 19, 2019 (CN) .......................... 201910533679.3

(51) Int. Cl.
*G06F 40/58* (2020.01)
*G06F 3/0481* (2022.01)
(Continued)

(52) U.S. Cl.
CPC ............ *G06F 40/58* (2020.01); *G06F 3/0485* (2013.01); *G06F 3/04883* (2013.01); *G06F 2203/04808* (2013.01)

(58) Field of Classification Search
CPC .... G06F 40/58; G06F 3/0485; G06F 3/04883; G06F 2203/04808; G06F 3/0481;
(Continued)

(56) References Cited

U.S. PATENT DOCUMENTS

2002/0013693 A1* 1/2002 Fuji .......................... G06F 40/58
704/8
2010/0302283 A1 12/2010 Sasaki et al.
(Continued)

FOREIGN PATENT DOCUMENTS

CN          101551860 A    10/2009
CN          101884023 A    11/2010
(Continued)

OTHER PUBLICATIONS

CN110166586B (Year: 2019).*
(Continued)

*Primary Examiner* — Mohammed H Zuberi
*Assistant Examiner* — Ahamed I Nazar
(74) *Attorney, Agent, or Firm* — Conley Rose, P.C.

(57) ABSTRACT

A content translation method includes displaying, by a terminal, a first user interface, where the first user interface includes a first translation result, and the first translation result is a translation result of first content, detecting, by the terminal, a first operation on the first user interface, displaying, by the terminal, a second user interface in response to the first operation on the first user interface, where the second user interface includes a second translation result, and the second translation result is a translation result of second content, and sending, by the terminal in response to the first operation on the first user interface, third content to a first server to translate the third content, where the second content is associated with the first content, and the third content is associated with the second content.

20 Claims, 40 Drawing Sheets

(51) Int. Cl.
*G06F 3/0485* (2022.01)
*G06F 3/04883* (2022.01)

(58) Field of Classification Search
CPC .. G06F 3/04842; G06F 40/131; G06F 3/0484; G06F 9/451
USPC .......................................................... 715/264
See application file for complete search history.

(56) References Cited

U.S. PATENT DOCUMENTS

| | | | |
|---|---|---|---|
| 2012/0166174 A1 | 6/2012 | Lipetskaia | |
| 2013/0007405 A1 | 1/2013 | Caskey et al. | |
| 2013/0007590 A1* | 1/2013 | Rivera | G06F 3/0481 715/781 |
| 2013/0050249 A1* | 2/2013 | Grabowski | G06F 16/9577 345/619 |
| 2015/0032440 A1 | 1/2015 | Hale | |
| 2015/0051898 A1 | 2/2015 | Cuthbert et al. | |
| 2015/0066907 A1* | 3/2015 | Somaiya | G06F 16/9535 707/722 |
| 2015/0128037 A1 | 5/2015 | Lee et al. | |
| 2015/0134318 A1 | 5/2015 | Cuthbert et al. | |
| 2016/0267076 A1* | 9/2016 | Travieso | G06F 40/143 |
| 2018/0101295 A1* | 4/2018 | Casey | G06F 3/0485 |
| 2018/0164963 A1* | 6/2018 | Ku | G06F 3/04842 |

FOREIGN PATENT DOCUMENTS

| | | |
|---|---|---|
| CN | 104615592 A | 5/2015 |
| CN | 104881406 A | 9/2015 |
| CN | 106020700 A | 10/2016 |
| CN | 106201277 A | 12/2016 |
| CN | 107153541 A | 9/2017 |
| CN | 207720194 U | 8/2018 |
| CN | 109101498 A | 12/2018 |
| CN | 109388810 A | 2/2019 |
| CN | 110442879 A | 11/2019 |
| CN | 110781688 A | 2/2020 |
| EP | 2234006 A1 | 9/2010 |
| EP | 2876549 A2 | 5/2015 |
| JP | H0981549 A | 3/1997 |

OTHER PUBLICATIONS

CN105468586A (Year: 2019).*
M. Dixon, et al, "Content and Hierarchy in Pixel-Based Methodsfor Reverse Engineering Interface Structure," Session: Predicting and Modeling Human Behaviors, May 7-12, 2011, Vancouver, BC, Canada, 10 pages.

* cited by examiner

CONT.
FROM

TO

CONT. FROM FIG. 12B

The presidential palace is also listed as a recommended list of must-see attractions in Nanjing.
Such a perfect combination, in the country is rare.
Nanjing must go to the attractions of the Qinhuai people. Nanjing is a rich and windy place, in which the Qinhuai River area is an important window to understand ancient Nanjing.
Nanjing Confucius Temple is in this area. Nanjing belonged to the yidu nature in the Ming Dynasty.
In the Qing Dynasty, it was the station

Such a perfect combination, in the country is rare.
Nanjing must go to the attractions of the Qinhuai people. Nanjing is a rich and windy place, in which the Qinhuai River area is an important window to understand ancient Nanjing.
Nanjing Confucius Temple is in this area. Nanjing belonged to the yidu nature in the Ming Dynasty.

CONT. FROM FIG. 12E

FIG. 12F

| | The presidential palace is also listed |
|---|---|
| H5 | as a recommended list of must-see |
| | attractions in Nanjing. |
| | Such a perfect combination, in the |
| | country is rare. |
| | Nanjing must go to the attractions of |
| H6 | the Qinhuai people. Nanjing is a rich |
| | and windy place, in which the Qinhuai |
| | River area is an important window to |
| | understand ancient Nanjing. |
| | Nanjing Confucius Temple is in this |
| | area. Nanjing belonged to the yidu |
| | nature in the Ming Dynasty. |
| | In the Qing Dynasty, it was the station |

FIG. 14

CONTENT TRANSLATION METHOD AND TERMINAL

CROSS-REFERENCE TO RELATED APPLICATIONS

This is a continuation of International Patent Application No. PCT/CN2020/086004 filed on Apr. 22, 2020, which claims priority to Chinese Patent Application No. 201910364974.0 filed on Apr. 30, 2019 and Chinese Patent Application No. 201910533679.3 filed on Jun. 19, 2019. All of the aforementioned patent applications are hereby incorporated by reference in their entireties.

TECHNICAL FIELD

This application relates to the field of terminal technologies, and in particular, to a content translation method and a terminal.

BACKGROUND

As terminals have increasingly powerful functions, more and more users view news, obtain information, view data, work on a mobile basis, or chat with friends through terminals. For example, it is simple and convenient for a user to obtain information from CNN or BBC News at any time in any place, or the user may share life or communicate with a foreign friend through TWITTER or INSTAGRAM at any time in any place without being limited by a distance, and a user in a company may work on a mobile basis or communicate with a foreign colleague through emails. These scenarios become a mainstream trend and are common in life and work.

However, when viewing news or obtaining information, the user sometimes encounters news and information that are written in languages foreign to the user, or communicates, through TWITTER or INSTAGRAM, with a friend who speaks a different language, or receives an email written by a colleague in a language foreign to the user like Italian or German for work communication. In this case, a convenient translation service is required.

SUMMARY

In view of this, this application provides a content translation method and a terminal. In the method, when a first translation result is displayed, a user performs a first operation, and a terminal displays a second translation result in a timely manner, and sends a third page for translation. In this way, a pretranslation function is implemented, and time of the user is saved.

To-be-translated content is pretranslated, to implement a quick response from the terminal to the user.

According to a first aspect, this application provides a content translation method. The method includes a terminal displays a first user interface, where the first user interface includes a first translation result, and the first translation result is a translation result of first content. The terminal detects a first operation on the first user interface. The terminal displays a second user interface in response to the first operation on the first user interface, where the second user interface includes a second translation result, and the second translation result is a translation result of second content. The terminal sends, in response to the first operation on the first user interface, third content to a first server to translate the third content, where the second content is associated with the first content, and the third content is associated with the second content. In the method, in response to the first operation on the first user interface, the terminal displays second translated content, and sends the third content to the first server for translation. To be specific, when the terminal displays the second translation result and detects the first operation, the terminal responds in a timely manner and displays the second translation result on the terminal, so that a user does not need to wait for a time period for sending the second content for translation. This saves time of the user and improves user experience. Then, the terminal sends subsequent content, namely, a third page, for translation in response to the first operation, to implement a pretranslation function. In addition, the user can continue to view a translation result by performing only the first operation such as an upward sliding operation on a translation interface, and the user can browse all to-be-translated content without performing interface switching for a plurality of times.

With reference to the first aspect, in a possible implementation, the method further includes that the terminal detects a second operation on the second user interface. The terminal displays a third user interface in response to the second operation on the second user interface, where the third user interface includes a third translation result, and the third translation result is a translation result of the third content. In response to the second operation on the second user interface, the terminal determines that the third content is end content, and skips performing a step of sending to-be-translated content to the first server. In this implementation, the terminal displays the second translation result in response to the second operation on the second user interface, and can continue to display translated content after the second operation is performed again on the interface in which the translation result is displayed. In this way, the user does not need to perform interface switching for a plurality of times when the user wants to browse all to-be-translated news. In addition, the terminal determines whether the third content is the last page, and when the third content is the last page, the terminal no longer sends to-be-translated content to the server. Because of performing the determining step, the terminal does not continue to send the to-be-translated content to the server for translation.

With reference to any one of the first aspect or the foregoing possible implementation of the first aspect, in a possible implementation, the method further includes that the terminal detects a second operation on the second user interface. The terminal displays a third user interface in response to the second operation on the second user interface, where the third user interface includes a third translation result, and the third translation result is a translation result of the third content. The terminal sends, in response to the second operation on the second user interface, fourth content to the first server to translate the fourth content, where the fourth content is associated with the third content. In this implementation, to-be-translated content such as news includes the fourth content associated with the third content, and the fourth content is continuous with the third content. In response to the second operation, for example, an upward sliding operation of the user, the terminal displays, in a timely manner, the third translation result that has been stored, so that the user does not need to wait for a time period for translating the third content, and the terminal sends the fourth content to the server for translation. In this way, a pretranslation function is implemented, and time of the user is saved.

With reference to any one of the first aspect or the foregoing implementations of the first aspect, the third content includes a sequence number, and the sequence number is used to identify first location information of the third content relative to other content. The terminal receives the third translation result from the first server. The terminal displays the third translation result based on the sequence number. In this implementation, the terminal marks to-be-translated content and makes labels by setting sequence numbers. When receiving translation results, the terminal may arrange the translation results based on the sequence numbers, to avoid making a mistake in a display order.

With reference to any one of the first aspect or the foregoing implementations of the first aspect, before the terminal displays the first user interface, the method includes that the terminal displays a fourth user interface, where the fourth user interface includes the first content. The terminal detects a third operation on the fourth user interface. The terminal sends the first content and the second content to the first server in response to the third operation on the fourth user interface. In this implementation, the translation function is triggered on the first user interface, namely, an interface in which to-be-translated content is displayed, and the terminal sends the first content and the second content, so that a real-time translation function and a pretranslation function are implemented, and the terminal enables the translation function only in response to the triggering of the user, and pretranslates the second content. If the terminal needs to display the second translation result, the terminal can display the second translation result after detecting the third operation. In this way, the terminal can respond to a user requirement in a timely manner, time of the user is saved, and user experience is improved.

With reference to any one of the first aspect or the foregoing implementations of the first aspect, the fourth user interface is a user interface of a first application, and before the terminal sends the second content to the first server, the method further includes that the terminal generates a scrolling instruction in response to a fourth operation on the fourth user interface. The first application obtains, from a first application server, fifth content corresponding to the scrolling instruction. The terminal receives the fifth content from the first application server. The terminal generates the second content based on the fifth content. In this implementation, a function of translating content of the first application is implemented. When the user performs the first operation on the interface of the first application on the terminal, the translation function is triggered, the terminal sends the scrolling instruction to the first application, the first application obtains continuous to-be-displayed content from the first server, to obtain the fifth content, and the terminal obtains the to-be-translated second content based on the fifth content, where the scrolling instruction is used to obtain, from the first application, content that is to be displayed but is not displayed on a touchscreen. Then, the terminal generates, based on the obtained content, content to be sent to a translation server. In this way, a user requirement is estimated, subsequent content is pretranslated for the user, a translation result to be displayed is prepared for the user, and the translation result is to be displayed for the user as required.

With reference to any one of the first aspect or the foregoing implementations of the first aspect, the scrolling instruction is an instruction for scrolling content by a length of L in a predetermined direction of a first user interface of the first application, the predetermined direction is upward, downward, leftward, or rightward, L is greater than 80 pixels, and L is less than a height of the display of the terminal. In this implementation, not only downward content pretranslation can be implemented, but also a leftward, rightward, or upward content pretranslation function can be implemented. The translation function is not only applied to an application, for example, an ebook, TWITTER, or INSTAGRAM, on which upward or downward sliding is performed for displaying, but also applied to an application, for example, albums or maps, on which leftward or rightward sliding is performed for displaying. In addition, the scrolling instruction takes effect only within a specific range. If L is greater than 80 pixels, it can be ensured that content sent for translation includes at least one line of new content. If L is smaller than the height of the display, it can be ensured that content sent for translation each time is continuous.

With reference to any one of the first aspect or the foregoing implementations of the first aspect, L is an empirical value (H−H1−H2) of a scrolling height of to-be-displayed content corresponding to an upward sliding operation when the user performs the upward sliding operation on the touchscreen. In this implementation, an empirical value of the scrolling height of the to-be-displayed content corresponding to the upward sliding operation of the user may be obtained based on big data. In this way, the user can view new content displayed in a translation interface in a comfortable and user-friendly manner, and user experience is improved.

With reference to any one of the first aspect or the foregoing implementations of the first aspect, the fifth content is in a format of a picture or a text. In this implementation, when the fifth content is a picture, a translation application can be applied to wide application scenarios, and the translation function can be used in all user interfaces except a user interface of the translation application. When the fifth content is a text, the translation function can be used in a case in which a text can be extracted from a to-be-translated user interface of an application. In this case, a translation speed is increased, and translation is implemented easily and quickly.

With reference to any one of the first aspect or the foregoing implementations of the first aspect, when the fifth content is a text, that the terminal obtains the to-be-translated second content based on the fifth content includes that the terminal removes, from the fifth content, same content between the fifth content and the first content. The same content is removed and no longer needs to be translated, to avoid a waste of resources. When the fifth content is a text, the same content may be removed after comparison.

With reference to any one of the first aspect or the foregoing implementations of the first aspect, the fifth content is in a format of a picture, and that the terminal generates the second content based on the fifth content includes that the terminal tailors the fifth content to obtain the second content, where a tailoring manner includes at least one of the fifth content is tailored by content of a first length downward from a top boundary, the fifth content is tailored by content of a second length upward from a bottom boundary, same content between the fifth content and the first content is removed from the fifth content, or an incomplete text on the bottom boundary is removed from the fifth content. In this implementation, when the fifth content is a picture, a translation application can be applied to wide application scenarios, and the translation function can be used in all user interfaces except a user interface of the translation application. In many cases, an interface of an application includes other redundant content such as an advertisement bar, a comment bar, and a floating window.

Because this part of content is redundant content, a waste of resources is caused if the redundant content is translated each time. The other redundant content such as the advertisement bar, the comment bar, and the floating window is cut off without being repeatedly translated, to avoid a waste of resources. In addition, the redundant content is removed without being repeatedly displayed each time when a translation result is received. Therefore, user experience is improved.

With reference to any one of the first aspect or the foregoing implementations of the first aspect, the first length is an empirical value H4 of a height of a redundant part such as an advertisement bar, a comment bar, or a floating window at the top of the touchscreen for most applications, the second length is an empirical value H3 of a height of a redundant part such as an advertisement bar, a comment bar, or a floating window at the bottom of the touchscreen for most applications, and the same content is content that is of the fifth content and that is the same as content of the first content. In this implementation, it is ensured that the second content includes no same content as the first content, and therefore a waste of resources is not caused. The foregoing empirical values H3 and H4 may be empirical values obtained through big data statistics on more than a specific quantity of common applications on smartphones commonly used in the market. According to a principle of tailoring more content rather than tailoring less content, the redundant part is tailored, and the same content is tailored. This ensures that there is no same part between associated content and that there is no waste of resources caused by translation of the same part. This can also ensure that to-be-translated content is continuous, facilitating splicing and displaying of a received translation result.

With reference to any one of the first aspect or the foregoing implementations of the first aspect, the incomplete text on the bottom boundary is removed from the fifth content by using an optical character recognition (OCR) method or an image recognition method. In this implementation, the OCR method is simple and convenient and has high accuracy, and the image recognition method can be applied to a case in which interaction cannot be performed between the first application and the translation application.

With reference to any one of the first aspect or the foregoing implementations of the first aspect, a method for removing, from the fifth content, the same content between the fifth content and the first content includes a pixel-by-pixel comparison method. In this implementation, the pixel-by-pixel comparison method is simple and convenient, has wide application scenarios, and has high accuracy during obtaining the same content through comparison.

With reference to any one of the first aspect or the foregoing implementations of the first aspect, the method further includes that the terminal determines second location information, where the second location information indicates a location of the second content in the fifth content. In this implementation, after receiving the second translation result, the terminal may put the second translation result back to an original location in the fifth content, and may restore the redundant part such as the advertisement bar and the comment bar. Even if the user starts the translation application, typesetting of the first application is still displayed. In this case, the user feels that the user still uses the original first application, for example, the TOUTIAO application, and the user has a high sense of control. Therefore, user experience is improved. If no new application is started, a translation result is displayed in the original first application. This is applicable to a scenario in which the user does not need to perform switching between applications.

With reference to any one of the first aspect or the foregoing implementations of the first aspect, the fourth user interface is a user interface of the first application, the terminal detects a fifth operation on the fourth user interface, and the terminal displays the first user interface in response to the fifth operation on the fourth user interface, where the first user interface is a user interface of a second application. This implementation is applicable to a case in which content of the first application is translated into a translation result and the translation result is presented in the second application, and implements an interaction process between the two applications. In this way, an intelligent scenario and a sense of intelligence are presented to the user, and user experience is good.

With reference to any one of the first aspect or the foregoing implementations of the first aspect, the fourth user interface is a user interface of the first application, the terminal detects a fifth operation on the fourth user interface, and the terminal displays the first user interface in response to the fifth operation on the fourth user interface, where the first user interface is a user interface of a second application, and the first translation result displayed in the first user interface is re-typeset by using the second application. This implementation is applicable to a case in which content of the first application is translated into a translation result and the translation result is presented in the second application, and implements an interaction process between the two applications. In this way, an intelligent scenario and a sense of intelligence are presented to the user. In addition, re-typesetting is performed by using the second application, and the second application may be presented according to a preference of the user, so that the user can perform setting and selection, and a sense of switching can be presented to the user. In this way, user experience is improved.

With reference to any one of the first aspect or the foregoing implementations of the first aspect, the fourth user interface is a user interface of the first application, the terminal detects a fifth operation on the fourth user interface, and the terminal displays the first user interface in response to the fifth operation on the fourth user interface, where the first user interface is a user interface of the first application. In this implementation, the translation result is directly displayed in the first application. This is simple, convenient, and direct. Therefore, user experience is improved, a scenario in which translation is completed in one application is implemented whereas a new application no longer needs to be started, and an original format or an original location of the first application is directly maintained.

With reference to any one of the first aspect or the foregoing implementations of the first aspect, the terminal displays a fifth user interface in response to the third operation on the fourth user interface, where the fifth user interface includes a translate control, and the translate control is used to trigger the terminal to send the first content and the second content. In this implementation, an entry control for performing full-screen translation is set. The translate control is used as an entry for full-screen translation, and the user may perform, for example, a tapping operation to implement the translation function. In addition, another control may be set in the fifth user interface for the user to perform selection. This presents a sense of control to the user, maintains a simple and convenient operation for the user, and improves user experience.

With reference to any one of the first aspect or the foregoing implementations of the first aspect, the third operations on the fourth user interface include a double-finger pressing operation and a tapping operation, the terminal displays a sixth user interface in response to the double-finger pressing operation, where the sixth user interface includes a translate control, and the tapping operation is an operation performed on the translate control, and the terminal detects the tapping operation on the translate control, and the terminal sends the first content and the second content. In this implementation, a unique operation mode is used, so that a cool image switching sense is presented to the user.

With reference to any one of the first aspect or the foregoing implementations of the first aspect, that the terminal displays a second user interface in response to the first operation on the first user interface, where the second user interface includes a second translation result includes that the terminal displays the second user interface in response to the first operation on the first user interface, where the second user interface includes the second translation result, and a fixed data amount of the second translation result is displayed on the second user interface. In this implementation, the fixed amount of the translation result is displayed on the touchscreen each time in response to the first operation but not in response to a difference of the first operation. The first operation may be an operation of tapping a next page, an operation of tapping a previous page, an operation of flipping a page, or the like. This is simple and convenient, and improves user experience.

With reference to any one of the first aspect or the foregoing implementations of the first aspect, that the terminal sends, in response to the first operation on the first user interface, third content to a first server to translate the third content includes that the terminal sends, in response to the first operation on the first user interface, the third content to the first server to translate the third content, where a fixed data amount of the third content is sent. In this implementation, a fixed amount of content is sent for translation each time in response to the first operation but not in response to a difference of the first operation. For example, the fixed amount may be a full screen, or may be a half of a screen. This is simple and convenient, and improves user experience.

With reference to any one of the first aspect or the foregoing implementations of the first aspect, the first operation is a sliding operation. In this implementation, the user can operate with one hand, and a sliding operation is a most commonly used operation of the user. In this case, the user does not need to change a habitual action. Instead, the terminal adapts to the user, so that the user can continue to view a translation result.

With reference to any one of the first aspect or the foregoing implementations of the first aspect, a length of the second translation result or a quantity of the second translation results displayed in the second user interface is directly proportional to a sliding distance or force strength of the sliding operation. In this implementation, the second translation result is gradually presented depending on an increase in the sliding distance of the sliding operation. A longer sliding distance of the sliding operation of the user indicates more displayed content, and a shorter sliding distance of the sliding operation of the user indicates less displayed content. In this way, interaction experience of the user is improved.

With reference to any one of the first aspect or the foregoing implementations of the first aspect, a length or a quantity of the third content that is sent is directly proportional to a sliding distance or force strength of the sliding operation. In this implementation, different content is to be sent for translation in response to the sliding operation of the user. Higher force strength or a longer sliding distance of the sliding operation indicates more content to be sent for translation. In this way, interaction experience is provided for the user.

With reference to any one of the first aspect or the foregoing implementations of the first aspect, before the terminal displays the first user interface, the method includes that the terminal displays a seventh user interface, where the seventh user interface is a user interface of a first application. The terminal detects a sixth operation on the seventh user interface. The terminal displays the first user interface in response to the sixth operation on the seventh user interface, where the first user interface is a user interface of a second application. In this implementation, it can be learned that interaction between the two applications is performed. This implementation is applicable to a case in which content of the first application is translated into a translation result and the translation result is presented in the second application, and implements an interaction process between the two applications. In this way, an intelligent scenario and a sense of intelligence are presented to the user, a sense of control is provided for the user, and interaction experience of the user is improved.

With reference to any one of the first aspect or the foregoing implementations of the first aspect, the translation results each are stored in a form of a picture. In this implementation, the translation result is displayed in the format of a picture, so that various forms of designs can be performed on the picture, to make the picture beautiful and cool.

With reference to any one of the first aspect or the foregoing implementations of the first aspect, to-be-translated content is sent to the first server in a form of a picture. In this implementation, a translation application can be applied to wide application scenarios, and the translation function can be used in all user interfaces except a user interface of the translation application.

With reference to any one of the first aspect or the foregoing implementations of the first aspect, the second user interface further includes a return control, the terminal detects a touch operation performed by the user on the return control, and the terminal displays a user interface of the first application in response to the touch operation. In this implementation, the return button is provided on the translation interface. This is applicable to a scenario in which the user returns to the original user interface of the first application when the user does not want to continue to view a translation result.

With reference to any one of the first aspect or the foregoing implementations of the first aspect, the terminal detects an operation on the second user interface, for example, the first operation, and the terminal displays a user interface of the first application in response to the touch operation. This ensures that the user can quickly return from the translation interface to the original user interface of the first application.

With reference to any one of the first aspect or the foregoing implementations of the first aspect, the first operation includes double-finger pressing, single-finger pressing, three-finger pressing, tapping, double tapping, upward sliding, downward sliding, leftward sliding, rightward sliding, or the like. The second operation includes double-finger pressing, single-finger pressing, three-finger pressing, tapping, double tapping, upward sliding, downward sliding, leftward sliding, rightward sliding, or the like. The third operation includes double-finger pressing, single-finger pressing, three-finger pressing, tapping, double tapping, upward sliding, downward sliding, leftward sliding, rightward sliding, or the like. The fourth operation includes double-finger pressing, single-finger pressing, three-finger pressing, tapping, double tapping, upward sliding, downward sliding, leftward sliding, rightward sliding, or the like. The fifth operation includes double-finger pressing, single-finger pressing, three-finger pressing, tapping, double tapping, upward sliding, downward sliding, leftward sliding, rightward sliding, or the like. The sixth operation includes double-finger pressing, single-finger pressing, three-finger pressing, tapping, double tapping, upward sliding, downward sliding, leftward sliding, rightward sliding, or the like. The foregoing operations are cool, unique, or convenient, or may be operated with one hand, and are common actions of the user, so that the user can quickly remember the foregoing operations without taking much effort.

With reference to any one of the first aspect or the foregoing implementations of the first aspect, the second content is in a context relationship with the first content, and the second content is continuous content of the first content, the third content is in a context relationship with the second content, and the third content is continuous content of the second content, the fourth content is in a context relationship with the third content, and the fourth content is continuous content of the third content, and the fifth content is in a context relationship with the fourth content, and the sixth content is continuous content of the fifth content. This ensures that content sent for translation is continuous, so that translation results are also continuous and include no skipping line or discontinuous line, and ensures that the user can smoothly read and easily understand the translation result.

With reference to any one of the first aspect or the foregoing implementations of the first aspect, a quantity of pages of content sent for translation each time may be one single page, or may be two or more pages, for example, three pages, four pages, five pages, ten pages, or hundreds of pages. The quantity of pages of content sent for translation each time may be the same or different, or may conform to a specific rule. In this way, a lot of content is pretranslated, and it is ensured that even if the user performs quick viewing, the user can still view a translation result.

According to a second aspect, this application provides a content translation method. The method includes, a terminal displays a first user interface of a first application, where the first user interface includes first content. The terminal detects a first operation performed by a user on the first user interface. The terminal displays a first user interface of a second application in response to the first operation, where the first user interface includes a first control. The terminal detects a second operation performed by the user on the first control. The terminal sends the first content and second content to a first server in response to the second operation, where the second content is associated with the first content. The terminal receives a first translation result and a second translation result from the first server, where the first translation result is a translation result of the first content, and the second translation result is a translation result of the second content. The terminal displays a second user interface of the second application, where the second user interface includes the first translation result. The terminal detects a third operation on the second user interface. The terminal displays a third user interface of the second application in response to the third operation performed by the user on the second user interface, where the third user interface includes the second translation result. The terminal sends third content to the first server in response to the third operation performed by the user on the second user interface, where the third content is associated with the second content. The terminal receives a third translation result from the first server, where the third translation result is a translation result of the third content.

In the method, in response to the first operation on the first user interface, the terminal sends the second content to the first server for translation. That is, in the method, to-be-translated content is pretranslated. In response to the third operation, the terminal responds in a timely manner and displays the second translation result on the terminal, so that the user does not need to wait for a time period for sending the second content for translation. This saves time of the user, improves user experience, and implements a quick response from the terminal to the user. In addition, the user can browse desired content by performing only an upward sliding operation on an interface in which a translation result is displayed, instead of performing interface switching for a plurality of times. This is simple and convenient, and improves user experience.

In a possible implementation of the second aspect, the first operation is a double-finger pressing operation, the second operation is a tapping operation, or the third operation is an upward sliding operation. In this implementation, a unique operation mode is used for the first operation, to present a cool picture switching feeling to the user. The second operation is to enable the user to operate with one hand, and a tapping operation or a sliding operation is a most commonly used operation of the user. In this case, the user does not need to change a habitual action. Instead, the terminal adapts to the user, so that the user can continue to view a translation result.

In a possible implementation of the second aspect, before the terminal sends the second content to the first server, the method further includes that the terminal generates a scrolling instruction in response to the first operation. The first application obtains fourth content from a first application server in response to the scrolling instruction. The terminal receives the fourth content from the first application server. The terminal generates the second content based on the fourth content. In this implementation, when the user triggers a translation function on the terminal, the terminal sends the scrolling instruction to the first application, the first application obtains continuous to-be-displayed content from the first server, to obtain the fourth content, and the terminal obtains the to-be-translated second content based on the fourth content, where the scrolling instruction is used to obtain, from the first application, content that is to be displayed but is not displayed on a touchscreen. In this implementation, a function of translating content of the first application is implemented. When the user performs the first operation on the interface of the first application on the terminal, the translation function is triggered, the terminal sends the scrolling instruction to the first application, and the first application obtains continuous to-be-displayed content from the first server, where the scrolling instruction is used to obtain, from the first application, content that is to be displayed but is not displayed on the touchscreen. Then, the terminal generates, based on the obtained content, content to be sent to a translation server. In this way, a user requirement is estimated, subsequent content is pretranslated for the user, a translation result to be displayed is prepared for the user, and the translation result is to be displayed for the user as required.

With reference to any one of the second aspect or the foregoing implementations of the second aspect, the scrolling instruction is an instruction for scrolling content by a length of L in a predetermined direction of the first application, the predetermined direction is upward, downward, leftward, or rightward, L is greater than 80 pixels, and L is less than a height of the touchscreen of the terminal. The translation function is not only applied to an application, for example, an ebook, TWITTER, or INSTAGRAM, on which upward or downward sliding is performed for displaying, but also applied to an application, for example, Albums or Maps, on which leftward or rightward sliding is performed for displaying. In addition, the scrolling instruction takes effect only within a specific range. If L is greater than 80 pixels, it can be ensured that content sent for translation includes at least one line of new content. If L is smaller than the height of the display, it can be ensured that content sent for translation each time is continuous.

With reference to any one of the second aspect or the foregoing implementations of the second aspect, the fourth content is in a format of a picture, and that the terminal generates the second content based on the fourth content includes that the terminal tailors the fourth content to obtain the second content, where a tailoring manner includes at least one of the following. The fourth content is tailored by content of a first length from a top boundary to a bottom boundary, the fourth content is tailored by content of a second length from the bottom boundary to the top boundary, same content between the fourth content and the first content is removed from the fourth content, or an incomplete text on the bottom boundary is removed from the fourth content. In this implementation, when the picture is used, a translation application can be applied to wide application scenarios. Other redundant content such as an advertisement bar, a comment bar, and a floating window is cut off without being repeatedly translated, to avoid a waste of resources. In addition, when a translation result is returned, the translation result can be directly displayed without displaying the redundant content. Therefore, user experience is improved. When fifth content is a picture, a translation application can be applied to wide application scenarios, and the translation function can be used in all user interfaces except a user interface of the translation application. In many cases, an interface of an application includes other redundant content such as an advertisement bar, a comment bar, and a floating window. Because this part of content is redundant content, a waste of resources is caused if the redundant content is translated each time. The other redundant content such as the advertisement bar, the comment bar, and the floating window is cut off without being repeatedly translated, to avoid a waste of resources. In addition, the redundant content is removed without being repeatedly displayed each time when a translation result is received. Therefore, user experience is improved.

In addition, for any implementation and a corresponding technical effect of the second aspect, refer to the different implementations and corresponding technical effects of the first aspect. Details are not described herein again.

According to a third aspect, this application provides a terminal, including one or more touchscreens, one or more memories, and one or more processors. The one or more memories store one or more programs. When the one or more processors execute the one or more programs, the terminal is enabled to implement the method according to any one of the foregoing implementations. In this aspect, the terminal implements the method according to any one of the foregoing implementations. The terminal pretranslates to-be-translated content, to implement a quick response from the terminal to a user. The user can view subsequent translated content by performing only a sliding operation on a translation interface, instead of performing user interface switching for a plurality of times. This is simple and convenient.

In addition, for any implementation and a corresponding technical effect of the third aspect, refer to the different implementations and corresponding technical effects of the first aspect. Details are not described herein again.

According to a fourth aspect, this application provides a terminal, including one or more touchscreens, one or more memories, one or more processors, and one or more translation modules. The one or more memories store one or more programs. The one or more translation modules are configured to translate content. When the one or more processors execute the one or more programs, the terminal is enabled to implement the method according to any one of the foregoing implementations. In this aspect, to-be-translated content is pretranslated, so that a quick response from the terminal to a user is implemented. The user can view subsequent translated content by performing only a sliding operation on a translation interface, instead of performing user interface switching for a plurality of times. This is simple and convenient. The terminal includes the translation module. Therefore, even if a network environment is not good, the translation function can be implemented without depending on a network.

In addition, for any implementation and a corresponding technical effect of the fourth aspect, refer to the different implementations and corresponding technical effects of the first aspect. Details are not described herein again.

According to a fifth aspect, this application provides a system, including the terminal and the first server according to any one of the foregoing implementations. The first server is configured to receive to-be-translated content sent by the terminal, and translate the to-be-translated content into a corresponding translation result. In this aspect, the system includes the terminal and the server. The system can pretranslate the to-be-translated content, to implement a quick response from the terminal to a user. The user can view subsequent translated content by performing only a sliding operation on a translation interface, instead of performing user interface switching for a plurality of times. This is simple and convenient.

In addition, for any implementation and a corresponding technical effect of the fifth aspect, refer to the different implementations and corresponding technical effects of the first aspect. Details are not described herein again.

According to a sixth aspect, this application provides a computer-readable storage medium, including instructions. When the instructions are run on an electronic device, the electronic device is enabled to perform the method according to any one of the foregoing implementations.

In addition, for any implementation and a corresponding technical effect of the sixth aspect, refer to the different implementations and corresponding technical effects of the first aspect. Details are not described herein again.

According to a seventh aspect, a computer program product including instructions is provided. When the computer program product runs on an electronic device, the electronic device is enabled to perform the method according to any one of the foregoing implementations.

In addition, for any implementation and a corresponding technical effect of the seventh aspect, refer to the different implementations and corresponding technical effects of the first aspect. Details are not described herein again.

BRIEF DESCRIPTION OF DRAWINGS

FIG. 12A, FIG. 12B, FIG. 12C, FIG. 12D, FIG. 12E, and FIG. 12F are a schematic diagram of a content translation method according to an embodiment of this application;

FIG. 14 is a schematic diagram of a content translation method according to an embodiment of this application;

DETAILED DESCRIPTION OF EMBODIMENTS

The following describes the embodiments of this application with reference to the accompanying drawings in the embodiments of this application.

Figure 1:
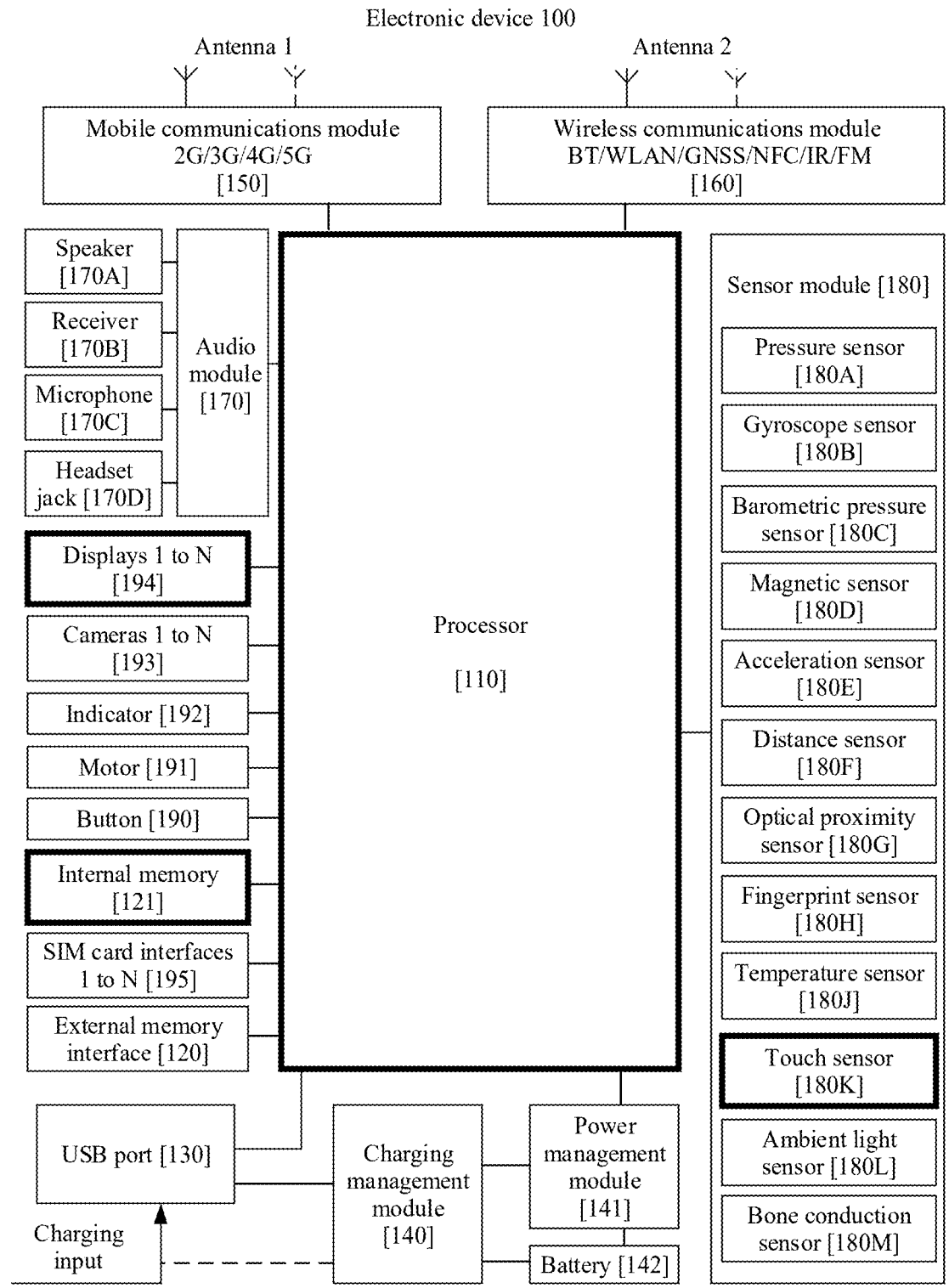
FIG. 1 is a schematic structural diagram of a terminal according to an embodiment of this application.

A method provided in the embodiments of this application may be applied to a terminal 100 shown in FIG. 1. FIG. 1 is a schematic structural diagram of the terminal 100.

The terminal 100 may include a processor 110, an external memory interface 120, an internal memory 121, a Universal Serial Bus (USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that a structure shown in this embodiment of the present disclosure does not constitute a specific limitation on the terminal 100. In some other embodiments of this application, the terminal 100 may include more or fewer components than those shown in the figure, or some components may be combined, or some components may be split, or different component arrangements may be used. The components shown in the figure may be implemented by using hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent components, or may be integrated into one or more processors.

The controller may generate an operation control signal based on an instruction operation code and a time sequence signal, to control instruction reading and instruction execution.

A memory may be further disposed in the processor 110, and is configured to store instructions and data. In some embodiments, the memory in the processor 110 is a cache memory. The memory may store instructions or data that has just been used or is cyclically used by the processor 110. If the processor 110 needs to use the instructions or the data again, the processor 110 may directly invoke the instructions or the data from the memory, to avoid repeated access and reduce waiting time of the processor 110. Therefore, system efficiency is improved.

In some embodiments, the processor 110 may include one or more interfaces. The interface may include an Inter-Integrated Circuit (I2C) interface, an I2C Sound (I2S) interface, a pulse-code modulation (PCM) interface, a universal asynchronous receiver/transmitter (UART) interface, a mobile industry processor interface (MIPI), a general-purpose input/output (GPIO) interface, a SIM interface, a USB port, and/or the like.

The I2C interface is a two-way synchronization serial bus, and includes a serial data line (SDA) and a serial clock line (SCL). In some embodiments, the processor 110 may include a plurality of groups of I2C buses. The processor 110 may be separately coupled to the touch sensor 180K, a charger, a flashlight, the camera 193, and the like through different I2C bus interfaces. For example, the processor 110 may be coupled to the touch sensor 180K through an I2C interface, so that the processor 110 communicates with the touch sensor 180K through the I2C bus interface, to implement a touch function of the terminal 100.

The I2S interface may be configured to perform audio communication. The PCM interface may also be configured to perform audio communication, and sample, quantize, and code an analog signal. The UART interface is a universal serial data bus, and is configured to perform asynchronous communication.

The MIPI interface may be configured to connect the processor 110 to a peripheral component such as the display 194 or the camera 193. The MIPI interface includes a camera serial interface (CSI), a display serial interface (DSI), or the like. In some embodiments, the processor 110 communicates with the camera 193 through the CSI interface, to implement a photographing function of the terminal 100. The processor 110 communicates with the display 194 through the DSI interface, to implement a display function of the terminal 100.

The GPIO interface may be configured by using software. The GPIO interface may be configured as a control signal or a data signal. In some embodiments, the GPIO interface may be configured to connect the processor 110 to the camera 193, the display 194, the wireless communications module 160, the audio module 170, the sensor module 180, and the like. The GPIO interface may alternatively be configured as the I2C interface, the I2S interface, the UART interface, the MIPI interface, or the like.

The USB port 130 is an interface that conforms to a USB standard specification, and may be a mini USB port, a micro USB port, a USB Type-C port, or the like. It may be understood that an interface connection relationship between the modules shown in this embodiment of the present disclosure is merely used as an example for description, and does not constitute a limitation on the structure of the terminal 100. In some other embodiments of this application, the terminal 100 may alternatively use an interface connection manner different from an interface connection manner in the foregoing embodiment, or use a combination of a plurality of interface connection manners.

The charging management module 140 is configured to receive a charging input from the charger. The power management module 141 is configured to connect the battery 142 and the charging management module 140 to the processor 110. A wireless communication function of the terminal 100 may be implemented by using the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna of the terminal 100 may be configured to include a single communications frequency band or a plurality of communications frequency bands. Different antennas may be further multiplexed to improve antenna utilization. For example, the antenna 1 may be multiplexed as a diversity antenna in a wireless local area network. In some other embodiments, the antenna may be used in combination with a tuning switch.

The mobile communications module 150 may provide a wireless communication solution that includes second generation (2G), third generation (3G), fourth generation (4G), fifth generation (5G), or the like and that is applied to the terminal 100. The mobile communications module 150 may include at least one filter, a switch, a power amplifier, a low noise amplifier (LNA), and the like. The mobile communications module 150 may receive an electromagnetic wave through the antenna 1, perform processing such as filtering or amplification on the received electromagnetic wave, and transmit a processed electromagnetic wave to the modem processor for demodulation. The mobile communications module 150 may further amplify a signal modulated by the modem processor, and convert the signal into an electromagnetic wave for radiation through the antenna 1. In some embodiments, at least some functional modules of the mobile communications module 150 may be disposed in the processor 110. In some embodiments, at least some functional modules of the mobile communications module 150 may be disposed in a same device as at least some modules of the processor 110.

The modem processor may include a modulator and a demodulator. The modulator is configured to modulate a to-be-sent low-frequency baseband signal into a medium-frequency or high-frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transfers an obtained signal to the application processor. The application processor outputs a sound signal by using an audio device (not limited to the speaker 170A, the receiver 170B, or the like), or displays an image or a video by using the display 194. In some embodiments, the modem processor may be an independent device. In some other embodiments, the modem processor may be independent of the processor 110, and is disposed in a same device as the mobile communication module 150 or another functional module.

The wireless communications module 160 may provide a wireless communication solution that includes a wireless local area network (WLAN) (for example, a WI-FI network), BLUETOOTH (BT), a global navigation satellite system (GNSS), frequency modulation (FM), a near-field communication (NFC) technology, an infrared (IR) technology, or the like and that is applied to the terminal 100. The wireless communication module 160 may be one or more devices that integrate at least one communication processing module. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, in the terminal 100, the antenna 1 is coupled to the mobile communications module 150, and the antenna 2 is coupled to the wireless communications module 160, so that the terminal 100 can communicate with a network and another device by using a wireless communications technology. The wireless communications technology may include a Global System for Mobile Communications (GSM), a General Packet Radio Service (GPRS), code-division multiple access (CDMA), wideband CDMA (WCDMA), time-division CDMA (TD-CDMA), Long-Term Evolution (LTE), BT, a GNSS, a WLAN, NFC, FM, an IR technology, and/or the like. The GNSS may include a Global Positioning System (GPS), a global navigation satellite system (GLONASS), a BEIDOU navigation satellite system (BDS), a Quasi-Zenith satellite system (QZSS), and/or a satellite-based augmentation system (SBAS).

The terminal 100 implements a display function by using the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs that execute a program instruction to generate or change display information.

The display 194 is configured to display an image, a video, and the like. The display 194 includes a display panel. The display panel may be a liquid-crystal display (LCD), an organic light-emitting diode (LED) (OLED), an active-matrix OLED (AMOLED), a flexible LED (FLED), a mini-LED, a micro-LED, a micro-OLED, a quantum-dot LED (QLED), or the like. In some embodiments, the terminal 100 may include one or N displays 194, where N is a positive integer greater than 1.

The terminal 100 may implement a photographing function by using the ISP, the camera 193, the video codec, the GPU, the display 194, the application processor, and the like.

The ISP is configured to process data fed back by the camera 193. The camera 193 is configured to capture a static image or a video. An optical image of an object is generated by using the lens, and is projected onto a photosensitive element.

The digital signal processor is configured to process a digital signal, and may process another digital signal in addition to the digital image signal. For example, when the terminal 100 selects a frequency, the digital signal processor is configured to perform Fourier transform and the like on frequency energy.

The video codec is configured to compress or decompress a digital video. The terminal 100 may support one or more types of video codecs. Therefore, the terminal 100 can play or record videos in a plurality of coding formats, for example, Moving Picture Experts Group (MPEG)-1, MPEG-2, MPEG-3, and MPEG-4.

The NPU is a neural-network (NN) computing processor. The NPU quickly processes input information with reference to a structure of a biological neural network, for example, with reference to a transfer mode between human brain neurons, and may further continuously perform self-learning.

The external memory interface 120 may be configured to connect to an external storage card such as a micro Secure Digital (SD) card, to extend a storage capability of the terminal 100. The external storage card communicates with the processor 110 through the external memory interface 120, to implement a data storage function. For example, files such as music and a video are stored in the external storage card.

The internal memory 121 may be configured to store computer-executable program code. The executable program code includes instructions. The internal memory 121 may include a program storage area and a data storage area. The program storage area may store an operating system, an application required by at least one function (for example, a sound playing function or an image playing function), and the like. The data storage area may store data (such as audio data and a phone book) and the like that are created during use of the terminal 100. In addition, the internal memory 121 may include a high-speed random-access memory, or may include a nonvolatile memory such as at least one magnetic disk storage device, a flash memory, or a Universal Flash Storage (UFS). The processor 110 runs the instructions stored in the internal memory 121 and/or the instructions stored in the memory disposed in the processor, to execute various function applications and data processing of the terminal 100.

In some embodiments of this application, the internal memory is further configured to store a translation application and buffer all pictures generated in a running process of the translation application. After a user exits the translation application, all the buffered pictures may be automatically deleted.

The terminal 100 may implement audio functions such as music playing and recording by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to encode and decode an audio signal. In some embodiments, the audio module 170 may be disposed in the processor 110, or some functional modules of the audio module 170 are disposed in the processor 110.

The speaker 170A, also referred to as a "horn", is configured to convert an electrical audio signal into a sound signal. The terminal 100 may be used to listen to music or answer a call in a hands-free mode over the speaker 170A.

The receiver 170B, also referred to as an "earpiece", is configured to convert an electrical audio signal into a sound signal. When the terminal 100 is used to answer a call or receive audio information, the receiver 170B may be put close to a human ear to listen to a voice.

The microphone 170C, also referred to as a "mike" or a "microphone", is configured to convert a sound signal into an electrical signal.

The headset jack 170D is configured to connect to a wired headset. The headset jack 170D may be the USB port 130, a 3.5 mm open mobile terminal platform (OMTP) standard interface, or a Cellular Telecommunications Industry Association (CTIA) standard interface.

The pressure sensor 180A is configured to sense a pressure signal, and may convert the pressure signal into an electrical signal. In some embodiments, the pressure sensor 180A may be disposed on the display 194. There is a plurality of types of pressure sensors 180A such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The terminal 100 determines strength of the force based on a change of the capacitance. When a touch operation is performed on the display 194, the terminal 100 detects strength of the touch operation by using the pressure sensor 180A. The terminal 100 may further calculate a touch location based on a detection signal of the pressure sensor 180A. In some embodiments, touch operations that are performed at a same touch location but have different touch operation strength may correspond to different operation instructions. For example, when a touch operation with touch operation strength less than a first pressure threshold is performed on a messages application icon, an instruction for viewing a Short Message Service (SMS) message is executed. When a touch operation with touch operation strength greater than or equal to the first pressure threshold is performed on the Messages application icon, an instruction for creating an SMS message is executed.

The gyroscope sensor 180B may be configured to determine a motion posture of the terminal 100. The barometric pressure sensor 180C is configured to measure barometric pressure. In some embodiments, the terminal 100 calculates an altitude based on a barometric pressure value measured by the barometric pressure sensor 180C, to assist in positioning and navigation. The magnetic sensor 180D includes a Hall sensor. The acceleration sensor 180E may detect magnitudes of accelerations in various directions (usually on three axes) of the terminal 100. The distance sensor 180F is configured to measure a distance. The terminal 100 may measure the distance in an infrared or a laser manner. In some embodiments, in a photographing scenario, the terminal 100 may measure a distance by using the distance sensor 180F, to implement quick focusing. The optical proximity sensor 180G may include an LED and an optical detector, for example, a photodiode. The ambient light sensor 180L is configured to sense ambient light brightness. The fingerprint sensor 180H is configured to collect a fingerprint. The terminal 100 may use a feature of the collected fingerprint to implement fingerprint-based unlocking, application lock access, fingerprint-based photographing, fingerprint-based call answering, and the like. The temperature sensor 180J is configured to detect a temperature.

The touch sensor 180K is also referred to as a "touch control device". The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor 180K. The touch sensor may transfer the detected touch operation to the application processor, to determine a type of a touch event. The display 194 may provide a visual output related to the touch operation. In some other embodiments, the touch sensor 180K may alternatively be disposed on a surface of the terminal 100 at a location different from a location of the display 194.

The bone conduction sensor 180M may obtain a vibration signal. The buttons 190 include a power button, a volume button, and the like. The button 190 may be a mechanical button, or may be a touch button. The terminal 100 may receive a button input, and generate a button signal input related to a user setting and function control of the terminal 100. The motor 191 may generate a vibration prompt. The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or detached from the SIM card interface 195, to implement contact with or separation from the terminal 100. The terminal 100 may support one or N SIM card interfaces, where N is a positive integer greater than 1. The SIM card interface 195 may support a nano SIM card, a micro SIM card, a SIM card, and the like. A plurality of cards may be simultaneously inserted into a same SIM card interface 195. The plurality of cards may be of a same type, or may be of different types. The SIM card interface 195 may be compatible with different types of SIM cards. The SIM card interface 195 may be further compatible with the external storage card. The terminal 100 interacts with a network by using the SIM card, to implement a call function, a data communication function, and the like. In some embodiments, the terminal 100 uses an embedded SIM (eSIM), that is, an embedded SIM card. The eSIM card may be embedded in the terminal 100, and cannot be separated from the terminal 100. A software system of the terminal 100 may use a layered architecture, an event-driven architecture, a microkernel architecture, a micro service architecture, or a cloud architecture.

Figure 2A:
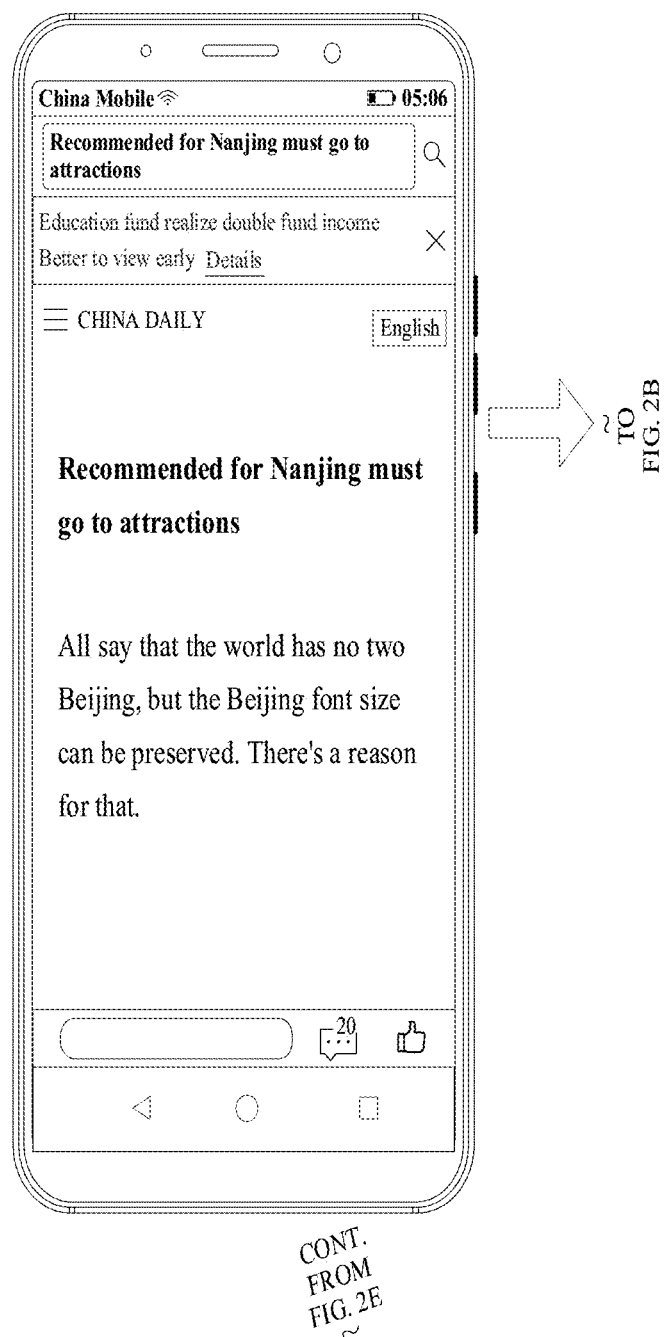
FIG. 2A, FIG. 2B, FIG. 2C, FIG. 2D, and FIG. 2E are schematic diagrams of user interfaces for translation on a terminal in the conventional technology.
Figure 2B:
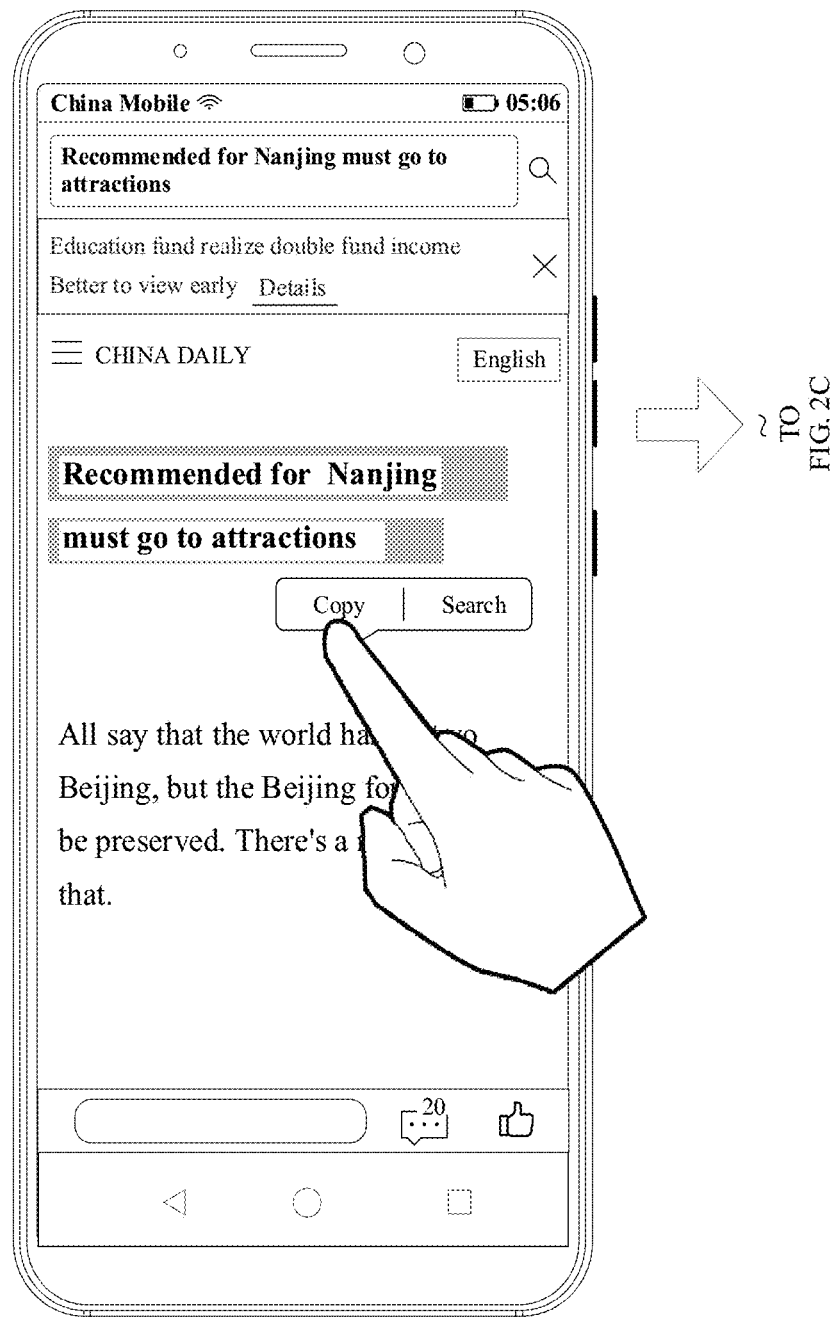
Figure 2C:
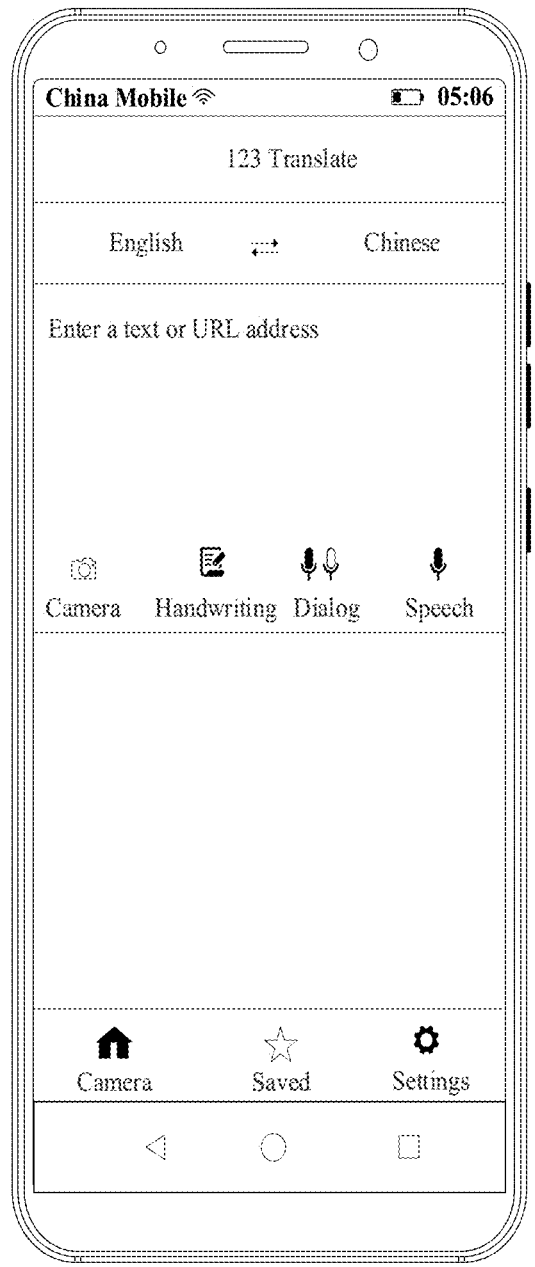
Figure 2D:
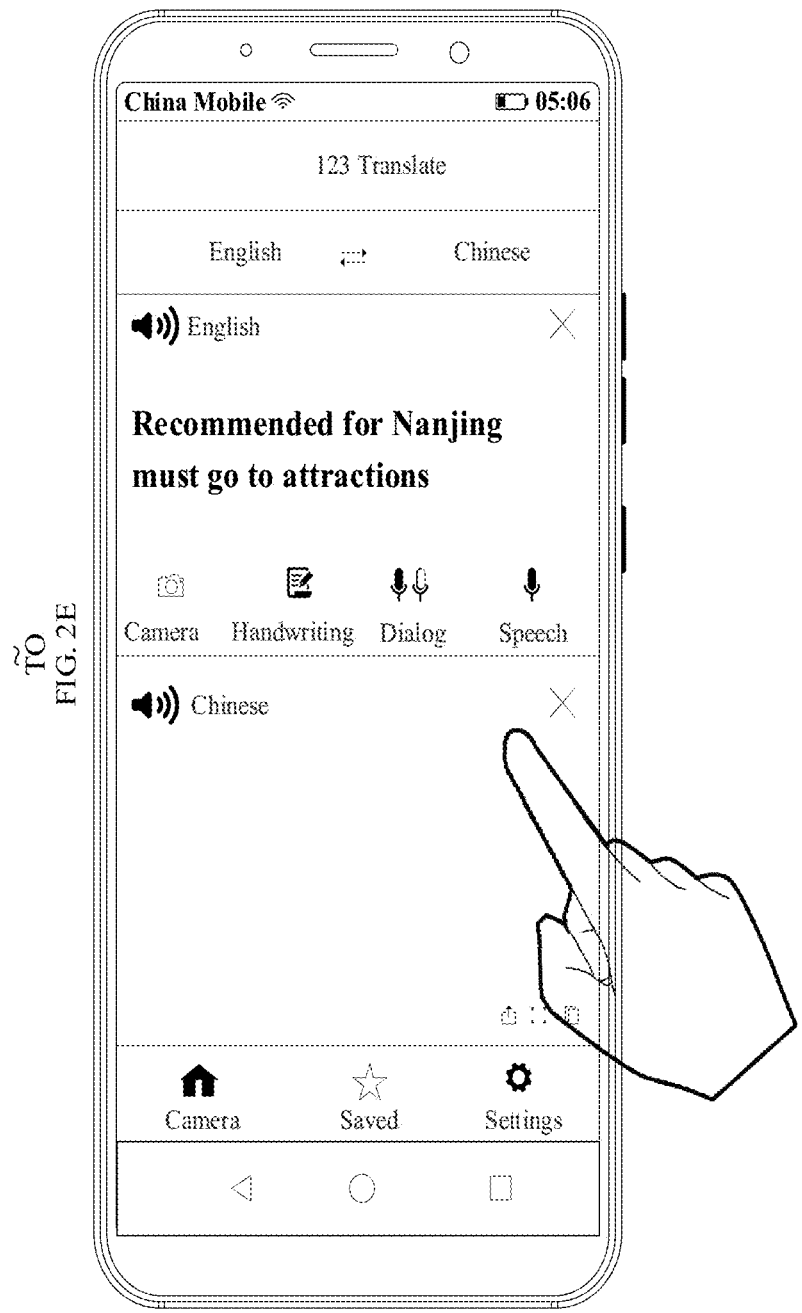
Figure 2E:

Refer to FIG. 2A to FIG. 2E. FIG. 2A to FIG. 2E show user interfaces for translation on a terminal in the conventional technology. In the method, the terminal needs to perform translation depending on a third-party app. For example, a user browses news through the CHINA DAILY app. As shown in FIG. 2A, during news browsing, if the user wants to translate the current news from English into Chinese for reading, an operation process to be performed by the user is as follows. As shown in FIG. 2B, the user first selects to-be-translated content in a news interface, in response to the selection operation of the user, the terminal displays the to-be-translated content in gray and displays a floating window, where the floating window includes a copy control, the user taps the copy control, and the terminal copies the to-be-translated content in response to the tapping operation. As shown in FIG. 2C, the user starts a translation interface of the third-party app, the user taps a language control on the translation interface to select a target language, and the terminal displays a to-be-translated text in English and a target text in Chinese in response to the tapping operation. As shown in FIG. 2D, the user pastes the to-be-translated content in a to-be-translated area in the translation interface, and the terminal displays the to-be-translated content in the to-be-translated area in the translation interface in response to the pasting operation. As shown in FIG. 2E, the terminal automatically performs translation, or performs translation in response to a tapping operation performed by the user on a translate control (not shown in the figure), and the terminal displays translated content in the translation interface, where the translated content is in Chinese. After browsing the translated content, the user switches back to the news interface, the user slides upward on a touchscreen to continue to browse the news. If the user wants to perform translation again, the user needs to repeat the foregoing operations. In the foregoing process, the user needs to perform user interface switching for a plurality of times. The operations are complicated, and experience is poor. The user may copy a uniform resource locator (URL) address of news in another similar user interface for translation on a terminal, instead of copying content of the news. Then, a user starts a translation interface of a third-party app, and pastes the URL address in a to-be-translated area in the translation interface. In response to the pasting operation, the terminal automatically goes to a page corresponding to the URL address and invokes content of the page for translation, and then displays translated content in the translation interface. However, in this process, the user needs to perform user interface switching for a plurality of times to browse all of the news. In this case, the terminal cannot quickly respond to a requirement of the user. In addition, the user further needs to be able to copying the URL address. For a case in which the user cannot invoke the URL address through most apps, the user cannot perform translation based on the URL address.

Figure 3A:
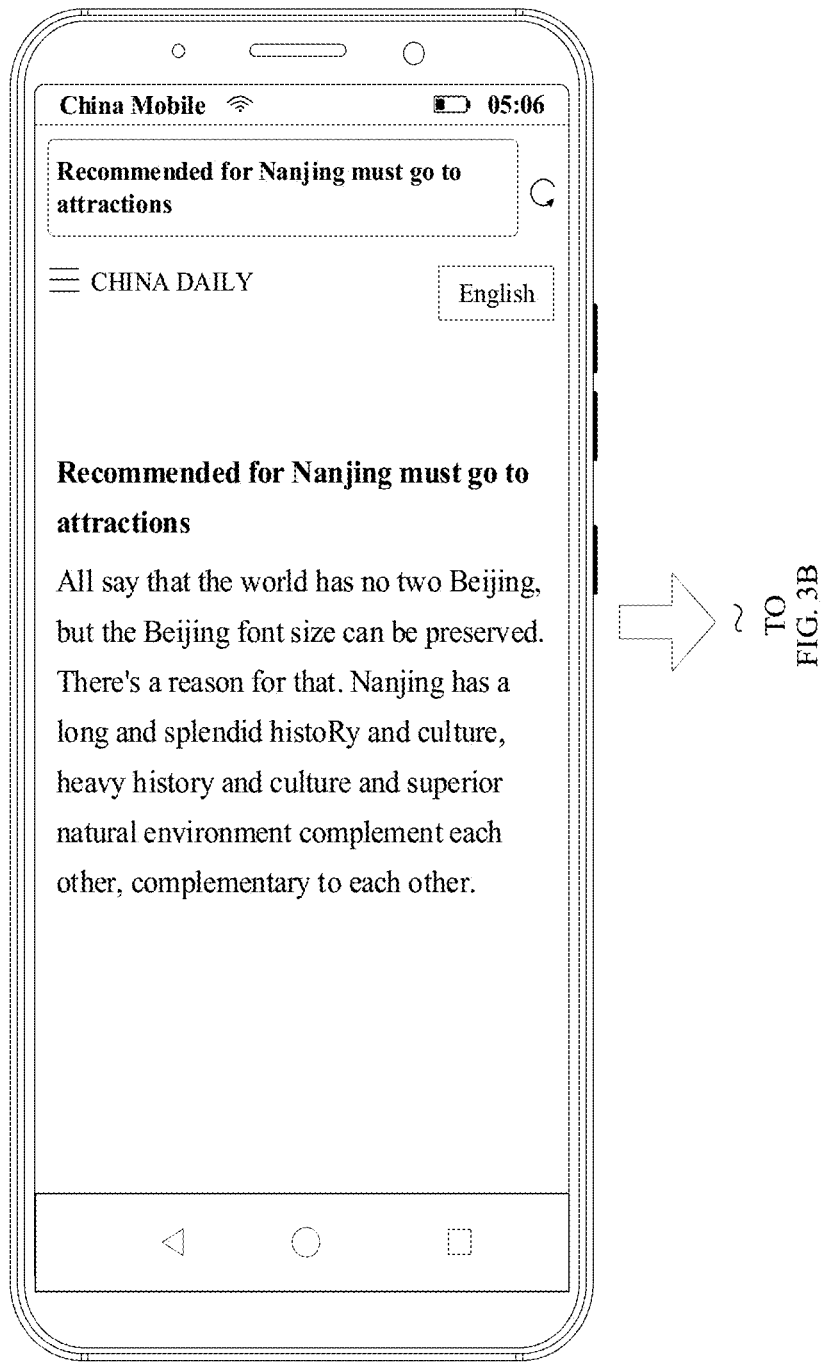
FIG. 3A, FIG. 3B, FIG. 3C, FIG. 3D, FIG. 3E, and FIG. 3F are schematic diagrams of user interfaces for translation on a terminal in the conventional technology.
Figure 3B:
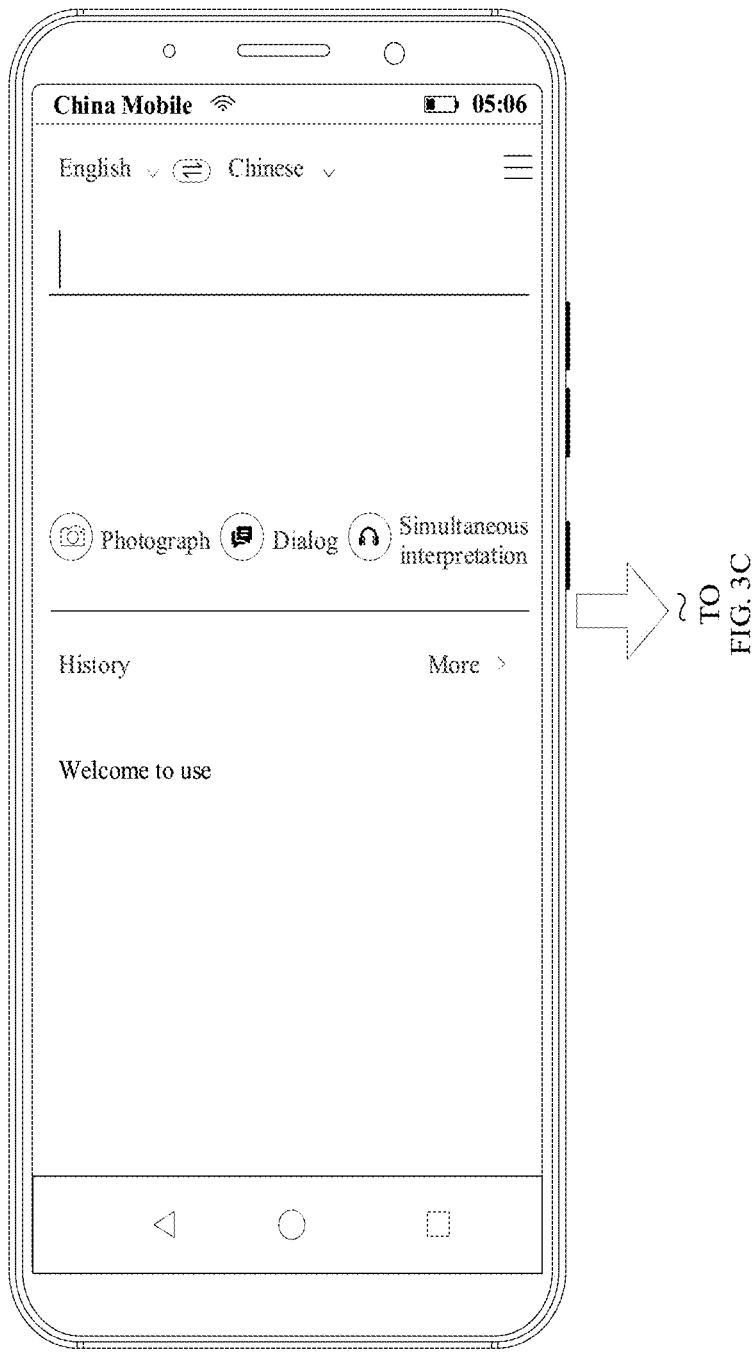
Figure 3C:
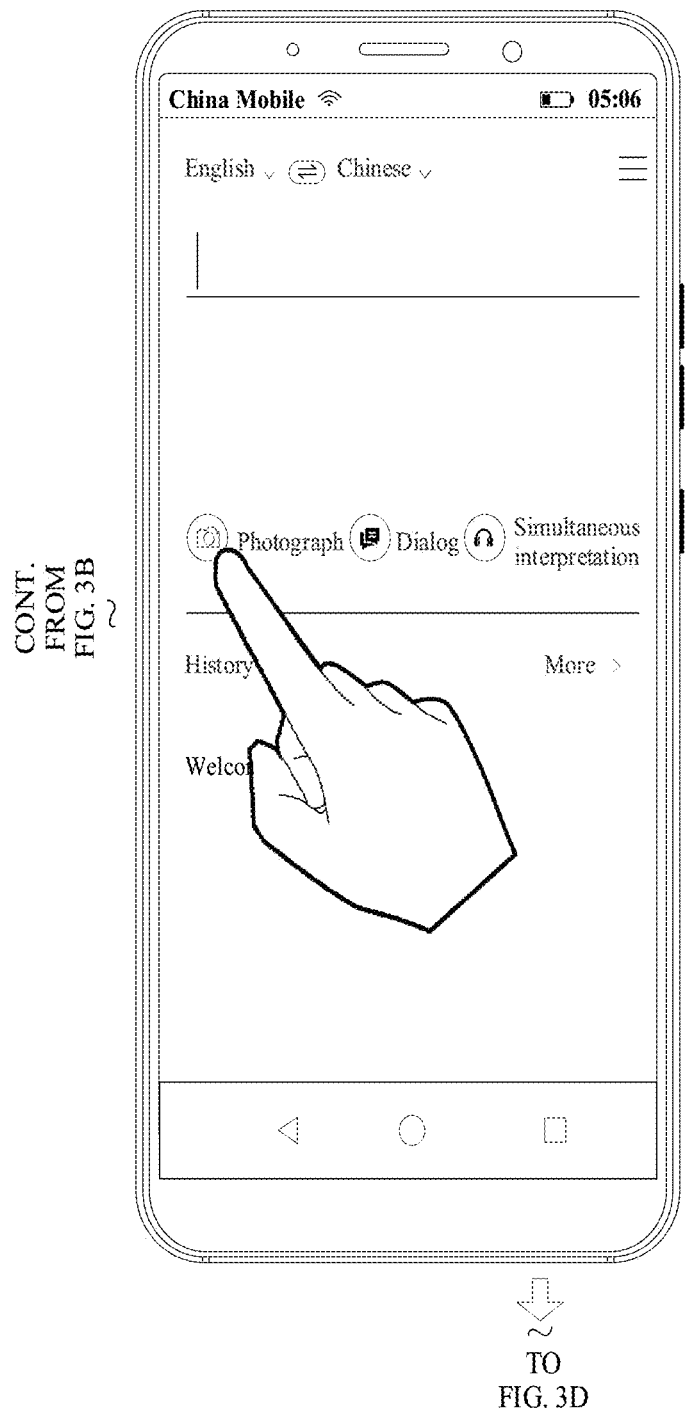
Figure 3D:
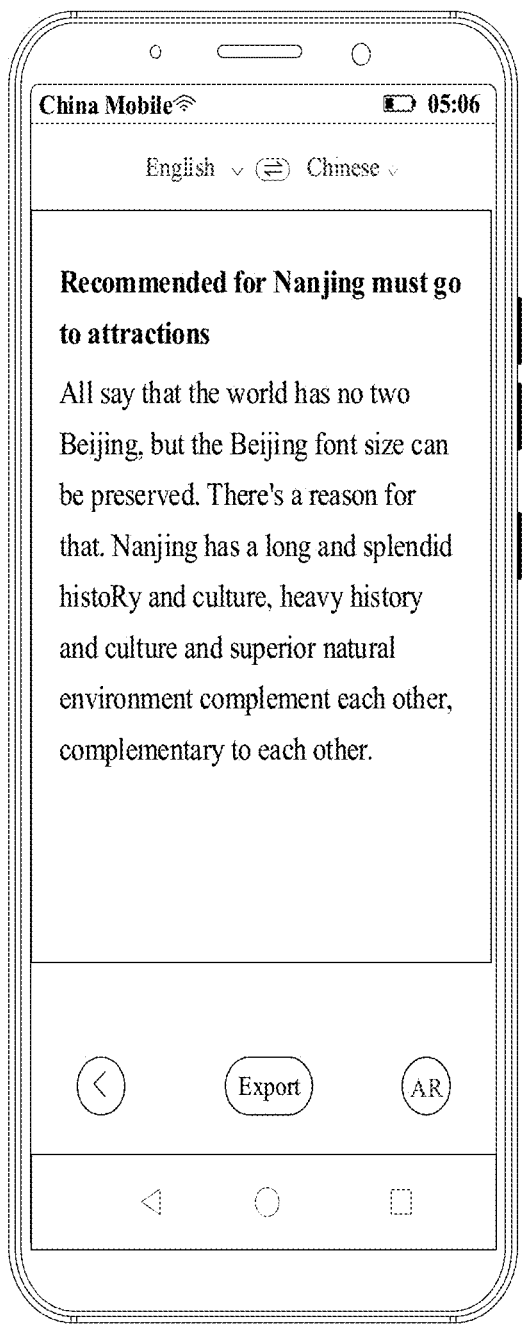
Figure 3E:
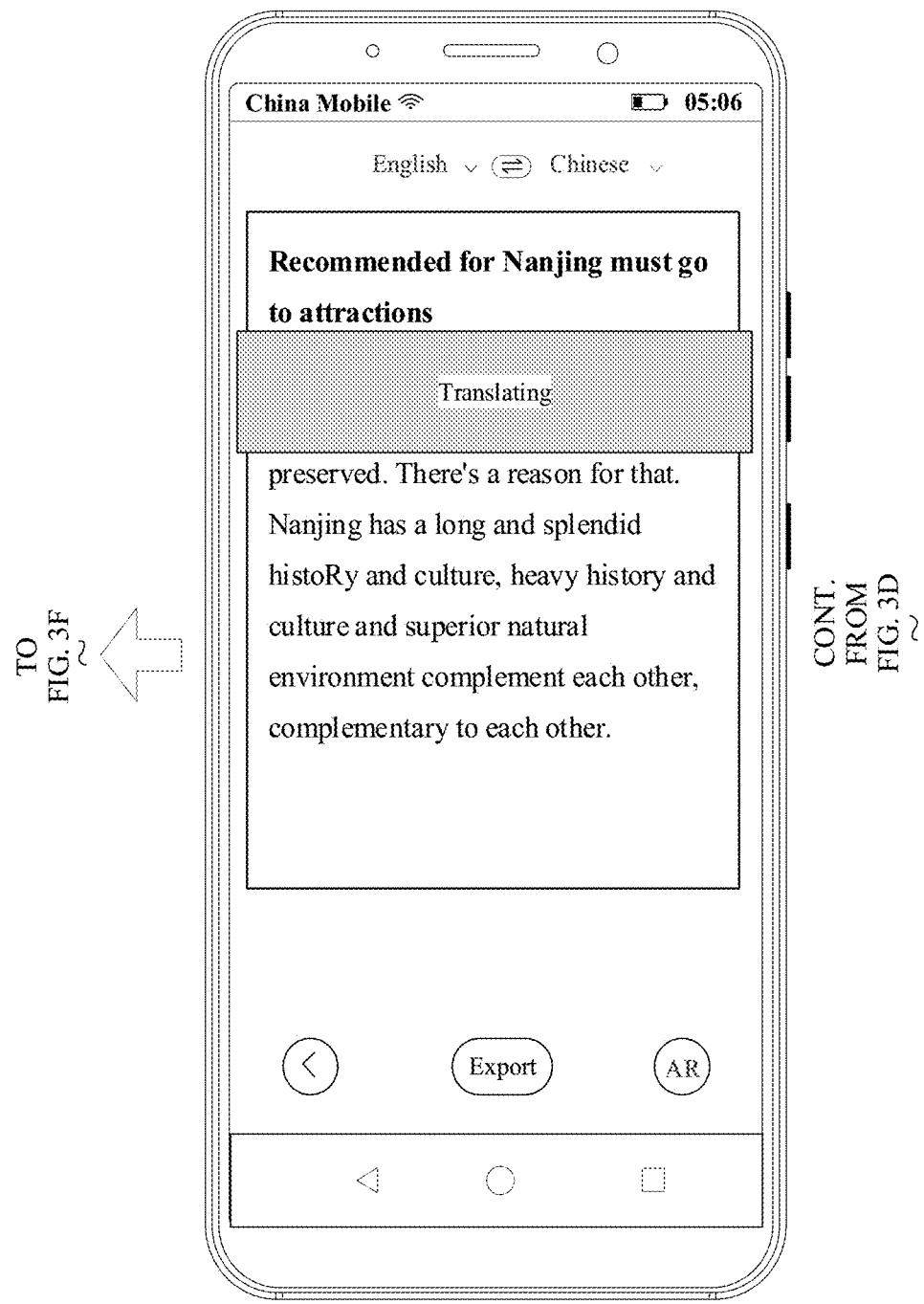
Figure 3F:
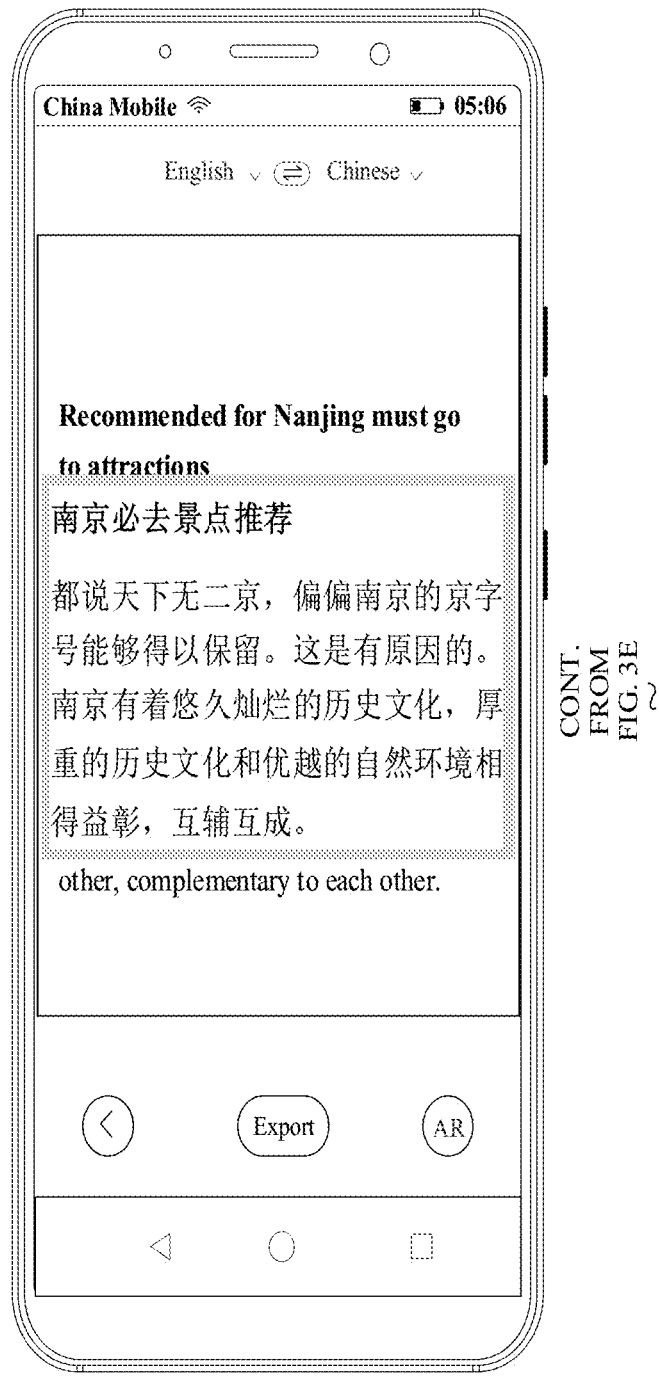

Refer to FIG. 3A to FIG. 3F. FIG. 3A to FIG. 3F show other user interfaces for translation on a terminal in the conventional technology. In the method, the terminal still needs to perform translation depending on a third-party app. For example, a user browses news through the CHINA DAILY app. A process of the method is as follows As shown in FIG. 3A, in a news interface of the CHINA DAILY app, the user performs a manual screenshot operation on a user interface for translation, and stores the obtained picture in the terminal. As shown in FIG. 3B, the user starts the third-party app, the terminal displays a translation interface, the user taps a language control on the translation interface to select a target language, and the terminal displays a to-be-translated text in English and a target text in Chinese in response to the tapping operation. As shown in FIG. 3C, the user taps a photograph control in a to-be-translated area, and the user may select a stored picture or directly take a photograph. As shown in FIG. 3D, the terminal displays a to-be-translated picture in the to-be-translated area. As shown in FIG. 3E, the terminal automatically performs translation, or performs translation in response to a tapping operation performed by the user on a translate control (not shown in the figure). As shown in FIG. 3F, the terminal displays a floating window, and displays translated content in the floating window, where the translated content is in Chinese. After browsing the translated content, the user switches back to the news interface, and the user slides upward on a touchscreen to continue to browse the news (not shown in the figure). If the user wants to perform translation again, the user needs to repeat the foregoing operations. In the foregoing process, a same problem exists, that is, the user still needs to perform user interface switching for a plurality of times. The operations are complicated, and experience is poor.

In the foregoing conventional technologies, the user needs to download the third-party app onto the terminal. When the user wants to complete translation of a relatively long piece of news, the user needs to perform interface switching for a plurality of times, and the terminal cannot quickly respond to the requirement of the user. This causes inconvenience to the user, wastes time of the user, and causes poor user experience. According to a translation result displaying method provided in the embodiments of this application, a user can complete translation of a relatively long piece of news without performing page switching for a plurality of times, and the user also does not need to copy to-be-translated content of a page or copy a URL address of the page. Therefore, the method is applicable to wide application scenarios, and has few limited conditions.

Figure 4:
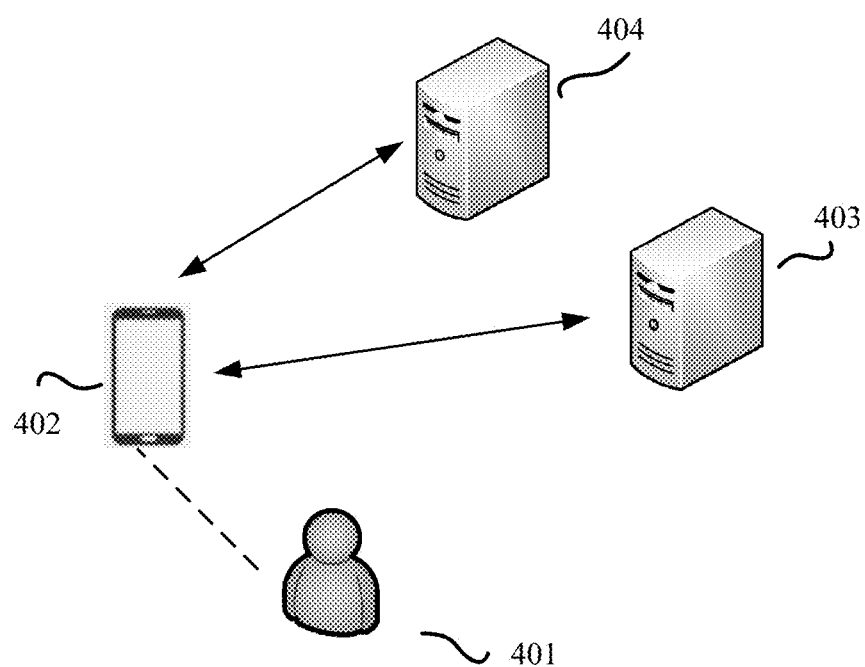
FIG. 4 is a schematic diagram of a scenario of a content translation method according to an embodiment of this application.

FIG. 4 is a schematic diagram of a scenario of a content translation method according to an embodiment of this application. As shown in FIG. 4, a translation server 403 may implement a translation function, and an application server 404 is a server, for example, for the CHINA DAILY app that is started by a user. A scenario in which a user 401 browses news through the CHINA DAILY app is still used as an example for description. On a touchscreen of a terminal 402, the user 401 wants to browse an interested piece of news by performing a tapping operation. In response to the operation, the terminal 402 sends a request to the application server 404 to download the news from the application server 404. When the user 401 wants to translate the news on the terminal 402, the user performs a trigger operation on the touchscreen of the terminal 402. The terminal 402 sends to-be-translated content to the translation server 403 in response to the trigger operation. The translation server 403 translates the received to-be-translated content, and returns a translation result to the terminal 402. After receiving the translation result, the terminal 402 displays the translation result on the touchscreen. When the terminal 402 sends the to-be-translated content to the server, the terminal may directly send a picture, or may directly send a text, or may extract a text from a picture and then send the obtained text.

Optionally, when the to-be-translated content sent by the terminal 402 to the translation server 403 is a text, the terminal 402 may send all content of the news to the translation server 403 for translation at a time, or may send all content of the news to the translation server 403 for translation in batches. For example, the terminal 402 sends news content displayed on a user interface to the translation server 403 for translation, and then sends news content continuous with the foregoing news content to the translation server 403 for translation.

Optionally, when the to-be-translated content sent by the terminal 402 to the translation server 403 is a picture, the terminal 402 may take a screenshot of all content of the news to obtain one picture including all the content, and then send the picture to the translation server 403 for translation. Alternatively, the terminal 402 may divide the news into different parts to form pictures, and send the pictures together or send the pictures for a plurality of times to the translation server 403 for translation.

The terminal in this application has a function of sending content to the translation server for translation or a function of performing translation by using a module of the terminal. The terminal is not limited to a mobile phone, but may also be another portable terminal, such as a tablet computer, a notebook computer, a desktop computer, a wearable device (such as a smartwatch) having a wireless communication function, or a vehicle-mounted device. The portable terminal includes but is not limited to a portable terminal using IOS®, Android®, Microsoft®, or another operating system.

Figure 5A:
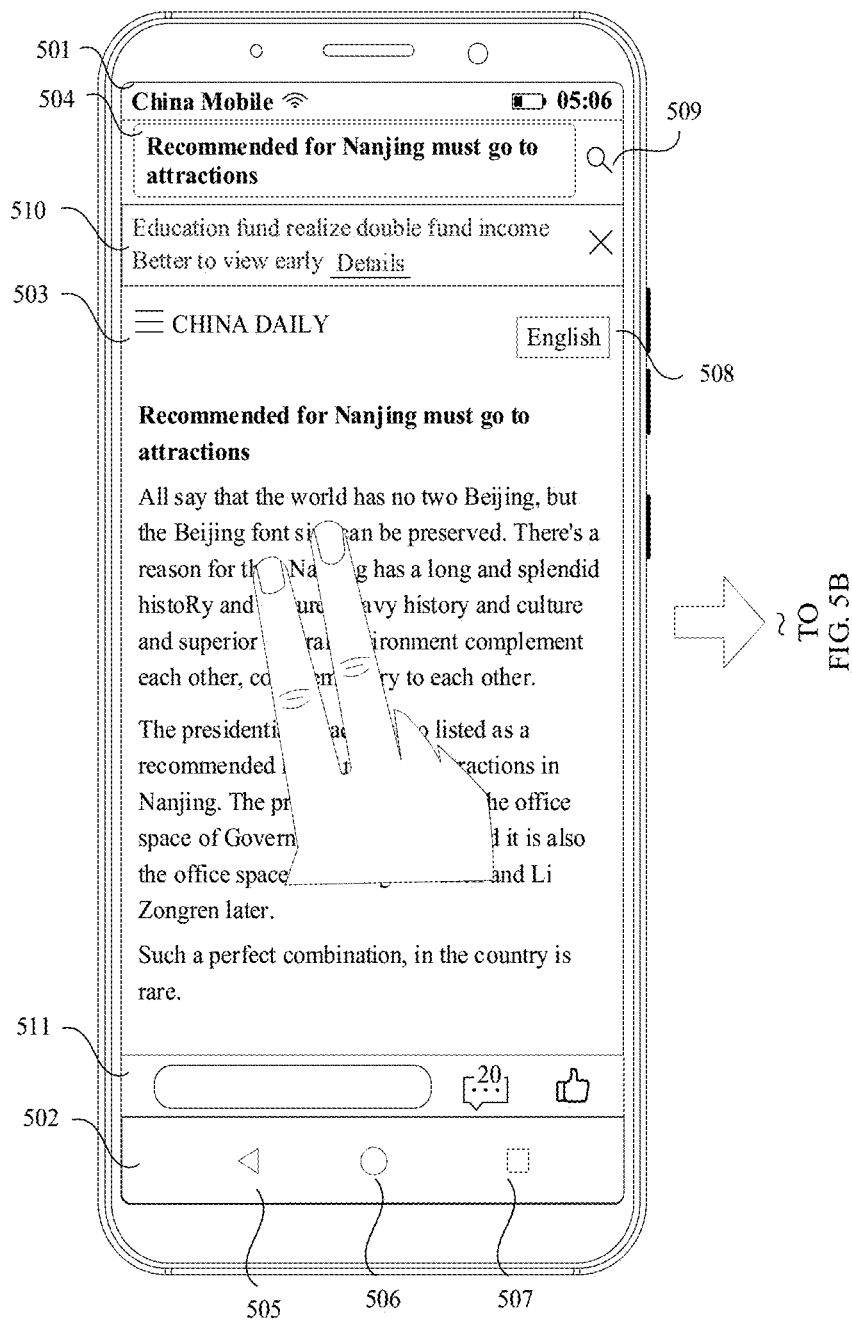
FIG. 5A, FIG. 5B, FIG. 5C, and FIG. 5D are schematic diagrams of user interfaces for content translation according to an embodiment of this application.

In some embodiments of this application, in any user interface, when the terminal detects a first touch operation that is performed by the user on the touchscreen through a finger (a stylus or the like) and whose strength is greater than a first pressure threshold, the terminal displays a control of a translation application in response to the first touch operation. The terminal detects a second touch operation performed by the user on the control of the translation application. In response to the second touch operation, the terminal executes a translation instruction, invokes an interface of a related application to complete the translation task, and then displays a translation result on the touchscreen. For example, the first touch operation may be an operation such as double-finger pressing, single-finger pressing, three-finger pressing, tapping, double tapping, or sliding from left to right, and the second touch operation may be an operation such as a tapping operation, double-finger pressing, single-finger pressing, three-finger pressing, tapping, double tapping, or sliding from left to right. FIG. 5A to FIG. 5D shows user interfaces for a content translation method according to an embodiment of this application. In this embodiment of this application, the CHINA DAILY application is used as an example for description, and a translation application may be started in any user interface other than a user interface of the translation application. For example, a user triggers the translation application by performing a first touch operation on a first interface. As shown in FIG. 5A, a terminal displays the first interface. In addition to an English news body, the first interface may include a status bar 501, a navigation bar 502, an advertisement bar 510, and a comment bar 511. The status bar 501 may include a name of an operator (China Mobile), a WI-FI icon, time, and a remaining battery level. The navigation bar 502 may include a return button 505, a home button 506, and a historical task view button 507. In some embodiments, the return button may also be referred to as a back button. The return button is used to return to a previous user interface, the home button is used to enter the home screen, and the historical task view button is used to enter a user interface in which a historical task is displayed. The first interface may further include an identifier 503 of the CHINA DAILY application, a language 508 used for the news, a search identifier 509, and a search content box 504.

Figures 5A, 5B, 5C:
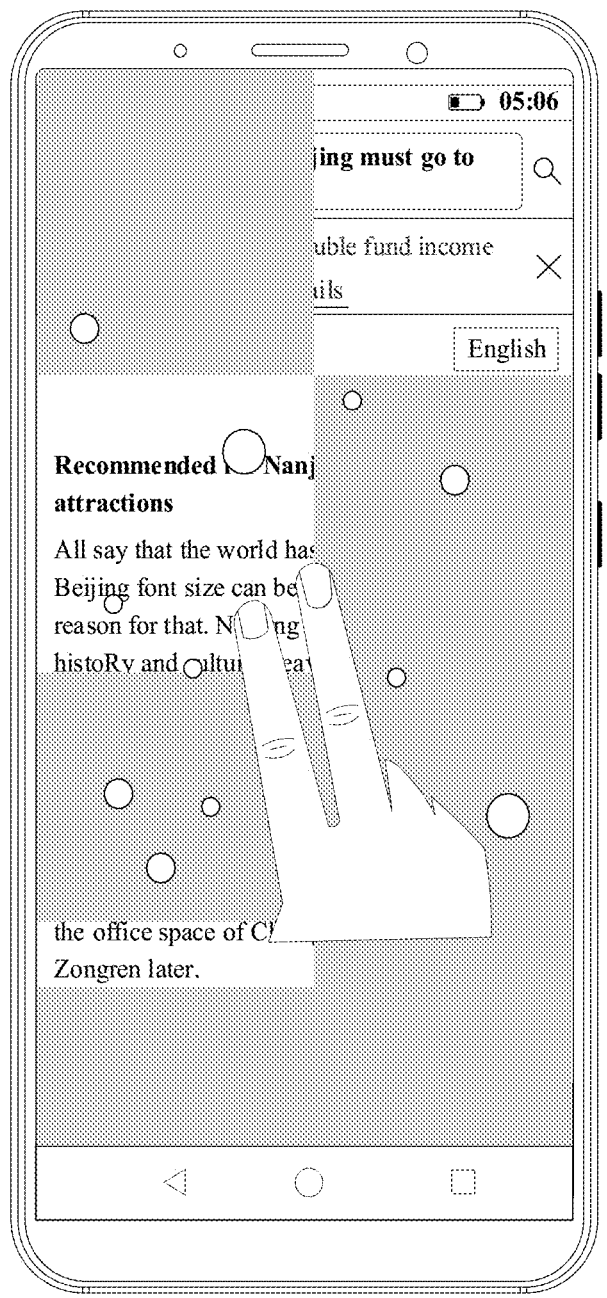
Figure 5C:
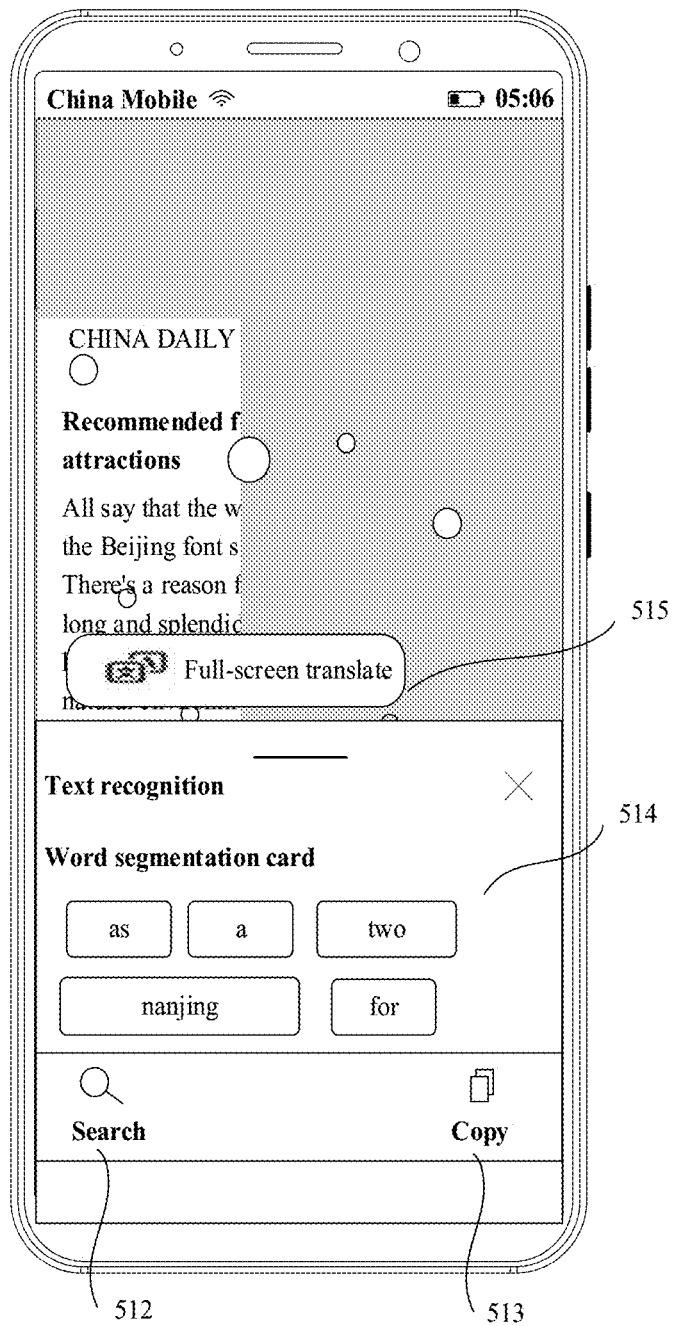

A first gesture operation used to remind a user has triggered the translation application. The terminal displays a second interface in response to the first gesture operation of the user, where the second interface is shown in FIG. 5B. Then, the second interface is switched to a third interface. The third interface is shown in FIG. 5C, and the third interface includes a full-screen translate control 515, a word segmentation card 514 obtained after text recognition, a search option 512, a copy option 513, and the like. Alternatively, the first interface may be directly switched to the third interface without being switched to the second interface. The full-screen translate control 515 is a control for enabling a function of the translation application. The user may enable the translation function by performing a selection operation, where the selection operation may be a tap and touch operation, a sliding operation, or the like shown in FIG. 5D. The word segmentation card 514 obtained after text recognition shown in FIG. 5C is a word obtained after the terminal recognizes a text in the first interface and performs sorting in descending order of usage frequencies of the user. The user may select a search function or a copy function in the interface shown in FIG. 5C. For example, the user may select a word such as "as", and then tap the search option 512 and the copy option 513 to perform corresponding operations. For example, the search option 512 is used to indicate that a search engine is switched to and "as" is used as a keyword to perform a search, and the copy option 513 is used to indicate that a copy operation is performed on "as". The terminal detects a selection operation performed by the user on the full-screen translate control, and the terminal displays translated content. As shown in FIG. 6A and FIG. 6B, the terminal displays a translation result in an interface of the translation application after being triggered. A user interface shown in FIG. 6A shows a translation result in the first interface shown in FIG. 5A. The terminal continues to display a subsequent translation result after the user performs an upward sliding operation 606 on the interface shown in FIG. 6A. A user interface 601 in FIG. 6B shows a continuous translation result of content in FIG. 6A, that is, a translation result of content continuous with the English content shown in FIG. 5A. Optionally, a prompt message may be set in the user interface shown in FIG. 6A, to remind the user to perform the upward sliding operation.

In this way, when the terminal displays translated content on a display, if the user wants to continue to translate or continue to browse translated content, the user only needs to perform the upward sliding operation on the interface in which content of the translated result is displayed, and the user neither needs to perform complicated user interface switching operations for a plurality of times, nor needs to perform operations such as copying and pasting. This is simple and convenient.

For example, when the user wants to view a page III', after the user performs the upward sliding operation 606, the terminal quickly displays the page III' on the touchscreen, so that there is no need to perform user interface switching for a plurality of times, and a quick response to a user requirement is implemented. In this embodiment of this application, the terminal uses a method in which one page is pretranslated. For example, when the user views a page II', the terminal stores the page III' in a buffer area. When the user performs the upward sliding operation 606, the terminal displays the page III', and stores a page IV' in the buffer area. Alternatively, the terminal may use a method in which two pages, three pages, four pages, . . . , a hundred pages, or the like are pretranslated. This is not limited herein, and a similar method may be used for implementation. A quantity of the pages may be recommended by a terminal manufacturer or a developer of the translation application, or may be set by the user, for example, set through selection by using a corresponding control in a setting option of the translation application on the terminal. When the terminal uses the method in which a plurality of pages such as two pages or three pages are pretranslated, before the terminal sends to-be-translated pages to a translation server, the terminal marks the to-be-translated pages, so that when the terminal receives a translation result, the terminal can determine a specific page that the received translation result corresponds to. Alternatively, the terminal may compare to-be-translated content with a received translation result (such as pattern comparison, format comparison, or text comparison) to determine a specific page that the translation result corresponds to. For example, before sending a page V, a page VI, and a page VII to the translation server, the terminal marks the pages (for example, marks the pages with labels or sequence numbers). When receiving a page, the terminal can determine that the page is a page V'. Alternatively, the terminal may compare the received page with the page V, the page VI, and the page VII, to determine that the received page is the page V'. In this case, a larger quantity of pages that are buffered in advance indicates a faster speed at which the terminal displays a translation result in response to an upward sliding operation of the user, a shorter waiting time, but a longer time for waiting for performing translation and returning translation results.

Figure 7:
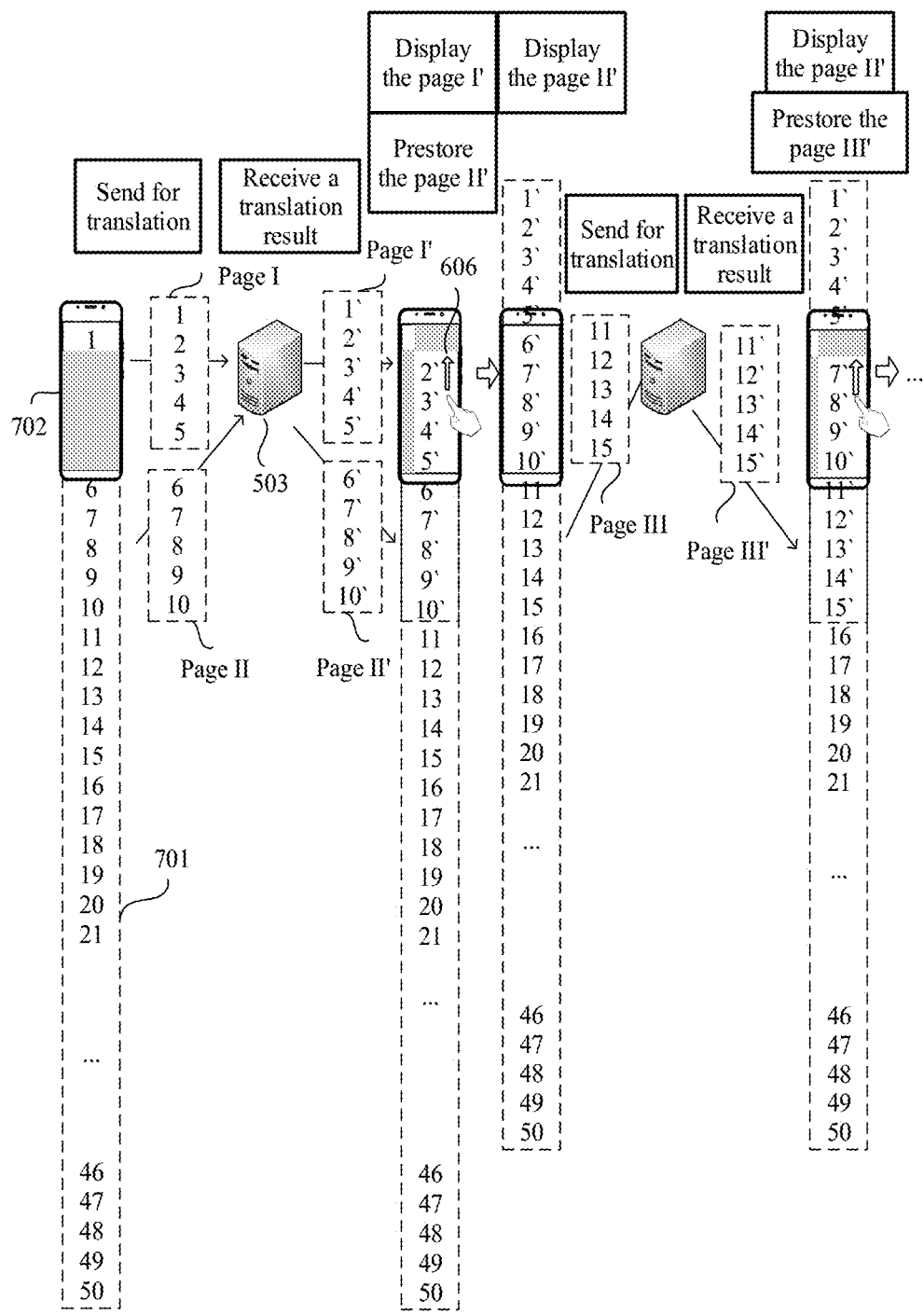
FIG. 7 is a schematic diagram of a content translation method according to an embodiment of this application.

Pretranslation of one page is used as an example. As shown in FIG. 7, a user interface of the terminal is represented as a gray area 702. That only news content is displayed in the gray area 702 is used as an example for description. Content "1, 2, 3, 4, 5, 6, 7, 8, 9, 10, . . . , 50" in 701 is used to indicate all news content, and the content is continuous. Only a part of the content "1, 2, 3, 4, 5" is displayed on the touchscreen, and "6, 7, 8, 9, 10, . . . , 50" is news content to be displayed on the touchscreen after the user performs an upward sliding operation on the touchscreen or performs a page flipping operation. The touchscreen detects a first touch operation performed by the user on the touchscreen, where the first touch operation is used to trigger a translation function, and in response to the first touch operation, the terminal sends a page I, a page II, and a translation request to the translation server 403 for translation. The page I includes content "1, 2, 3, 4, 5", the page II includes content "6, 7, 8, 9, 10", content of the page I and content of the page II are continuous, and the translation request includes a target language. The translation server 403 performs translation, and returns translation results to the terminal. The terminal receives the translation results sent by the translation server 403, where content included in a page I' is "1', 2', 3', 4', 5'", and content included in a page II' is "6', 7', 8', 9', 10'". As shown in FIG. 7, the page I' is a translation result corresponding to the page I, a translation result corresponding to content "1" is "1'", a translation result corresponding to content "2" is "2'", and the rest may be deduced by analogy. The terminal automatically displays the page I' on the touchscreen, and stores the page II' in the buffer area. The touchscreen detects an upward sliding operation 606 performed by the user on an interface in which the page I' is displayed. The touchscreen displays the page II' "6', 7', 8', 9', 10'" in response to the upward sliding operation 606 of the user, and sends a page III and a translation request to the translation server 403. Translation is performed by using a method the same as the method used for the page II, and the rest may be deduced by analogy. Details are not described herein. Details about how to obtain the pages I, II, and III are described below, and therefore, the details are not described herein.

It can be learned that according to the foregoing method, the user only needs to perform the upward sliding operation on the interface in which content of the translation result is displayed, and the user neither needs to perform complicated user interface switching operations for a plurality of times, nor needs to perform operations such as copying and pasting. This is simple and convenient.

Figure 8:
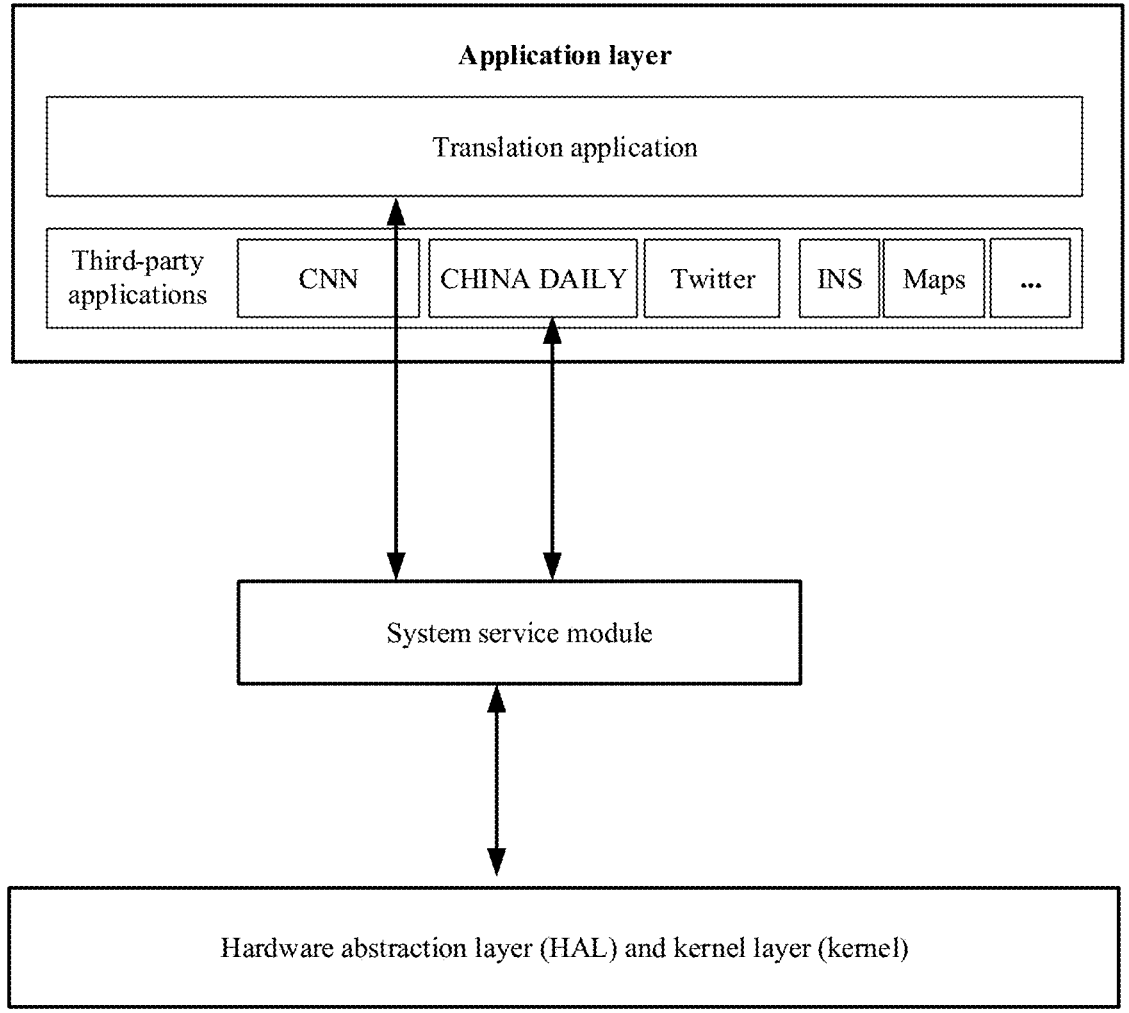
FIG. 8 is a block diagram of a software structure of a terminal according to an embodiment of this application.

In the foregoing embodiment, the page I is an entire screen of content displayed by the terminal in portrait mode, and the page II is a next entire screen of content that is displayed by the terminal in portrait mode and that is continuous with the page I. In other words, a height of content newly added to the page II relative to the page I is a height H of the touchscreen in portrait mode. The following describes how to obtain the pages I and II. Refer to FIG. 8. FIG. 8 is a schematic diagram of a software structure of a terminal according to an embodiment of this application. The page I and the page II that are sent by the terminal to a translation server 403 may be sent in a format of a text, or may be sent in a format of a picture. A system service module in FIG. 8 is configured to store an instruction and data of the translation application. Content such as the data stored in the system service module may be cleared or partially cleared after the user exits the translation application.

When the terminal sends the page I and the page II to the translation server 403 in a format of a text, in response to a tapping operation performed by the user to enable a function of the translation application, the system service module obtains stored data corresponding to the content "1, 2, 3, 4, 5" currently displayed on a touchscreen, reads the stored data, generates a text format to obtain the page I. Similarly, in response to a tapping operation performed by the user to enable the function of the translation application, the system service module of the terminal generates a scrolling instruction. In response to the scrolling instruction, a third-party application applies to a third-party application server to obtain content of the page II. The third-party application server sends the content and format information of the page II to the system service module. The system service module receives the content and format information of the page II, reads the data, generates a text format to obtain the page II, and stores the page II in the system service module. The system service module marks the received content and format information of the page II with a label, and only stores the page II in the system service module instead of sending the page II to a window manager for displaying. For the page II, the system service module generates the scrolling instruction in response to the tapping operation performed by the user to enable the function of the translation application. For the page III, the system service module generates the scrolling instruction in response to an upward sliding operation 606 performed by the user on the touchscreen. A method similar to the method used for the page III is used for a page IV, a page V, and the rest may be deduced by analogy.

When the terminal sends the page I and the page II to the translation server 403 in a format of a picture, in response to a tapping operation performed by the user to enable a function of the translation application, the system service module obtains stored data corresponding to the content "1, 2, 3, 4, 5" currently displayed on the touchscreen, and reads the stored data to generate a picture format and obtain the page I. Similarly, in response to a tapping operation performed by the user to enable the function of the translation application, the system service module of the terminal generates a scrolling instruction. In response to the scrolling instruction, a third-party application applies to a third-party application server to obtain content of the page II. The third-party application server sends the content and format information of the page II to the system service module. The system service module receives the content and format information of the page II, reads the data, generates a picture format to obtain the page II, and stores the page II in the system service module. The system service module marks the received content and format information of the page II with a label, and only stores the page II in the system service module instead of sending the page II to a window manager for displaying. For the page II, the system service module generates the scrolling instruction in response to the tapping operation performed by the user to enable the function of the translation application. For the page III, the system service module generates the scrolling instruction in response to an upward sliding operation 606 performed by the user on the touchscreen. A method similar to the method used for the page III is used for a page IV, a page V, and the rest may be deduced by analogy. In this way, the function of the translation application is applicable to wider application scenarios, and may be used in any user interface, and a problem that the terminal cannot directly obtain a text from a page is avoided. In the following embodiments of this application, that the page is sent in a format of a picture is used as an example for description.

Optionally, when the system service module marks the page II with a label, and only stores the page II instead of sending the page II to the window manager for displaying, the terminal sets a display priority of the translation application to be higher than a display priority of the third-party application, for example, higher than a display priority of the CHINA DAILY application. In this case, the interface of the translation application is preferentially displayed on the touchscreen, and an interface of the third-party application is placed under the interface of the translation application. For example, the translation application is displayed in a manner similar to a floating window, floating above the third-party application. Only the interface of the translation application may be displayed on the touchscreen. Although the third application is also displayed on the touchscreen, the user cannot perceive the third application. The translation application has been started and displayed on the touchscreen. The third-party application typesets, based on corresponding format information, the content of the page II obtained from the server, and then sends the content for displaying. Because the translation application has been started, the user cannot see displayed content of the third-party application, for example, the CHINA DAILY application. To be specific, a next page of the CHINA DAILY application is flipped to, and is not displayed on the touchscreen, but the user interface of the translation application is displayed on the touchscreen. If the user taps a return button on the interface of the translation application, the CHINA DAILY application is displayed on the touchscreen, and an interface after the page flipping is displayed. For example, when a page VI' of the translation application is displayed on the touchscreen, if the user taps the return button, the CHINA DAILY application is switched back and displayed on the touchscreen, and a user interface for a page VII of the CHINA DAILY application is displayed.

In an optional implementation, when receiving a translation result, the terminal needs to determine a specific page that the translation result corresponds to. For example, after receiving a translation result, that is, the page I' or the page II', if the terminal determines that the translation result is the page I', the terminal directly displays the translation result on the touchscreen. The determining may be performed in a manner of marking a page before sending the page (for example, marking the page with a label or writing a page number) or in a manner of comparison (such as pattern comparison, format comparison, or text comparison), to determine a specific page that the translation result corresponds to.

Figure 5D:
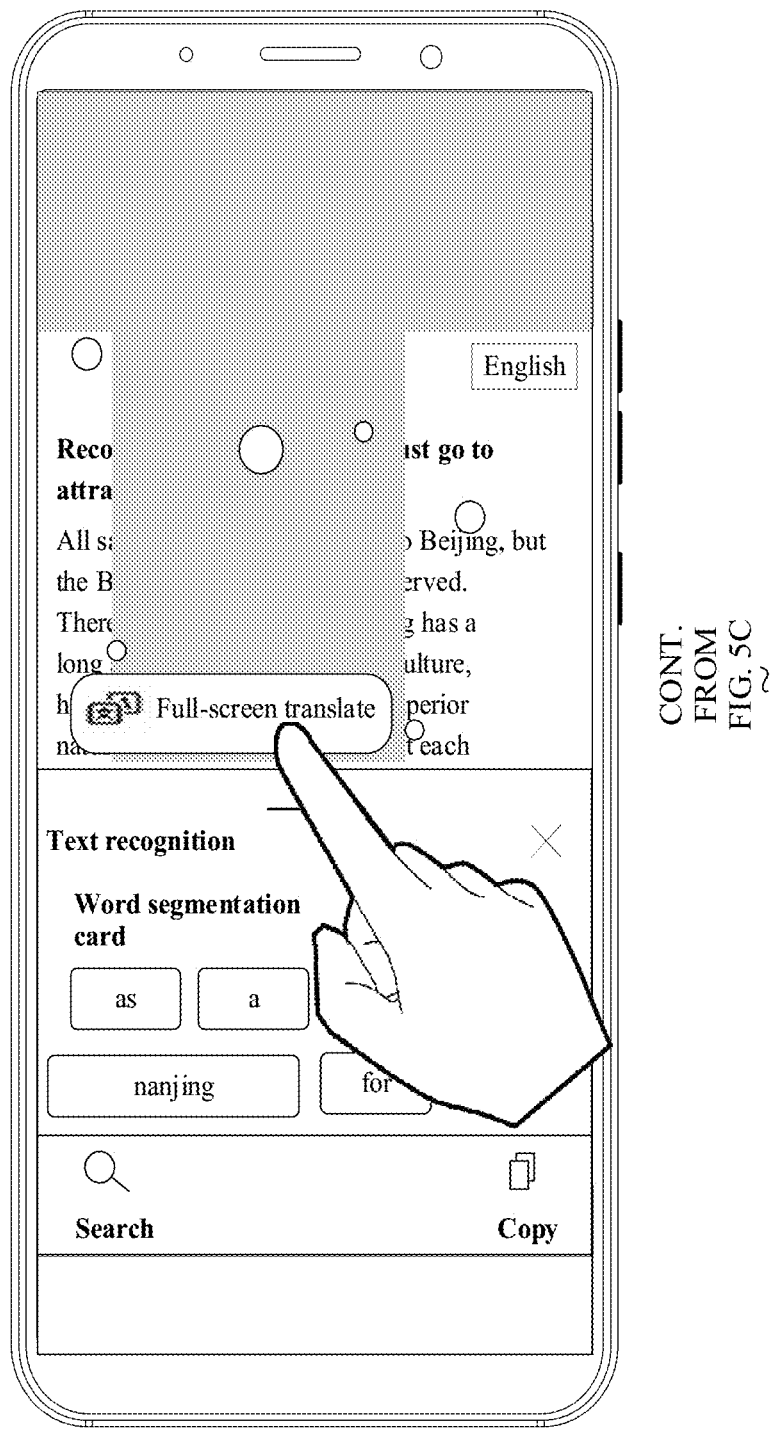
Figure 6A:
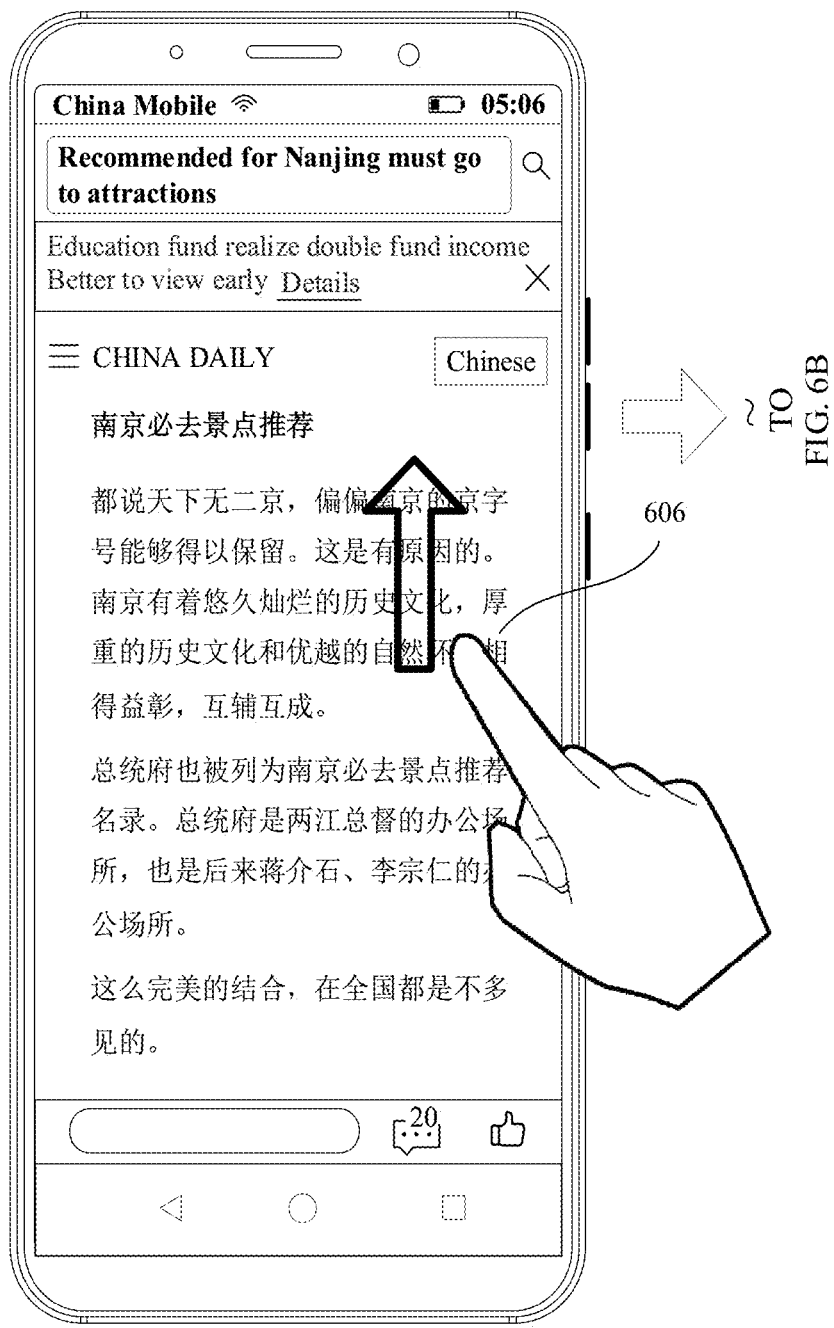
FIG. 6A and FIG. 6B are schematic diagrams of user interfaces for content translation according to an embodiment of this application.
Figure 6B:
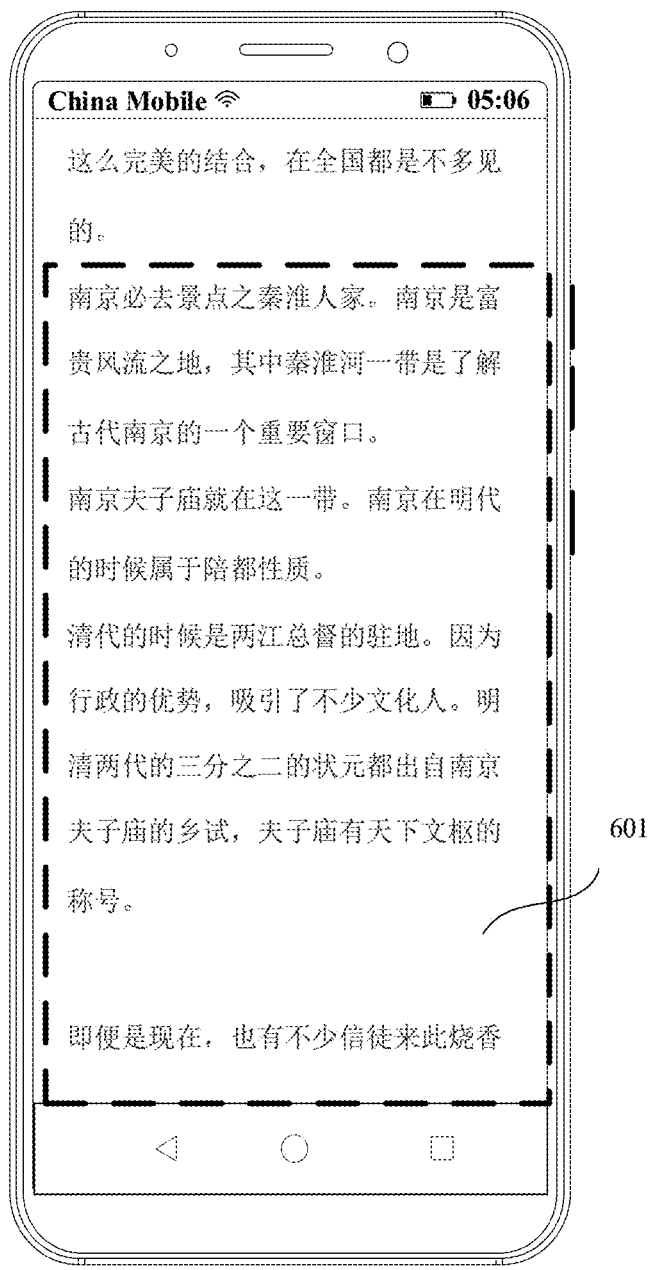

In an optional implementation, after the terminal starts the translation application and before the terminal displays the page I', for example, between FIG. 5D and FIG. 6A, the user needs to wait for the page I' and the page II' to be returned to the terminal. In this case, if an interface is in a blank state, user experience is poor. Therefore, the first interface, for example, the interface shown in FIG. 5A, in which the terminal starts the translation application may be displayed as a user interface between FIG. 5D and FIG. 6A. It may be understood that The user performs, in the first interface, the first touch operation for starting the translation application, and in response to the first touch operation, the terminal takes a screenshot of the current first interface, and stores the screenshot in the system service module. After the user taps the full-screen translate control 515 in the interface shown in FIG. 5D, the system service module displays the screenshot on the touchscreen. After receiving the page I', the system service module displays the page I' on the touchscreen instead of the screenshot. Optionally, when the screenshot is displayed on the touchscreen, a waiting icon such as a rotating hourglass icon or a gradient circle icon may also be displayed.

How to display the pages I' and II' obtained in the foregoing embodiment is described below. For a case in which the system service module obtains a translated text and format information from the translation server. In an optional implementation, for the translation application, a format and typesetting of the CHINA DAILY application is used. To be specific, paragraphs on the page I' may one-to-one correspond to paragraphs on the page I, paragraphs on the page II' may also one-to-one correspond to paragraphs on the page II, and the rest may be deduced by analogy. The page I is used as an example. After receiving the translated text and the format information, the terminal erases the page I to remove content of the page I, and the terminal writes the translated text at a corresponding location based on the received format information, to form a picture as the page I', and stores the page I' in the buffer area. In another optional implementation, the system service module may perform re-typesetting on the translated text, and display the translated text in a format of the system service module. In another optional implementation, the system service module directly replaces displayed content of the third-party application, and displays translated content in the interface of the third-party application. Optionally, the user performs a tapping operation on the interface in which the translated content is displayed, and the terminal displays content that is of the third-party application and that has not undergone translation. The format information includes location information, color information, and the like. The same method is used for the page II, the page III, and the like. Details are not described herein.

In an optional implementation, after receiving the page I', the terminal may not only directly display the page I', but also store the page II', the page III', the page IV', and the like in the buffer area, and in response to an upward sliding operation 606 of the user, the terminal directly reads content from the buffer area and displays the content on the touchscreen. Alternatively, after receiving the page II', the terminal may splice the page II' and the page I' to form one picture, and the terminal can display only a part of the picture including the page II' and the page I' on the touchscreen. After receiving the page III', the terminal splices the page III' and the page II' to form one picture including the page I', the page II' and the page III', and the terminal can display only a part of the picture including the page III', the page II', and the page I' on the touchscreen. A same method is used for the page IV', and the rest may be deduced by analogy. Details are not described herein.

The following describes a direction of the scrolling instruction. In the foregoing embodiment, in response to the scrolling instruction sent by the system service module, the third-party application obtains, from the third-party application server, content that is continuous with the currently displayed content. When the user performs a sliding operation on the touchscreen, content displayed on the touchscreen changes in response to the sliding operation. The scrolling instruction is sent by the system service module and is used to imitate an operation of the user, and leads to a result the same as a result generated by the sliding operation performed by the user on the touchscreen. For example, a page 99 of an ebook is currently displayed, and the user performs an operation of upward sliding for a particular distance on the touchscreen. In response to the operation of the user, the ebook obtains content of a page 100 from an ebook server. The terminal receives the content of the page 100, typesets the page 100 of the ebook and displays the page 100 on the touchscreen. Correspondingly, the page 99 of the ebook is currently displayed. After the system service module sends a scrolling instruction for a next page in the interface of the translation application, in response to the scrolling instruction, the ebook obtains the content of the page 100 from the ebook server. The terminal receives the content of the page 100, generates a to-be-translated page 100, and stores the to-be-translated page 100 in the system service module, instead of sending the to-be-translated page 100 to the window manager for displaying. Similarly, the system service module may send a scrolling instruction for a previous page, to obtain a to-be-translated page 98, where the scrolling instruction for the previous page is used to imitate an instruction of the user for downward sliding for a particular distance. Similarly, for another example, if a picture in an Albums application is currently displayed, the system service module may send a rightward scrolling instruction or a leftward scrolling instruction. A generated result is the same as a result generated by rightward or leftward sliding of the user for a particular distance in an interface of the Albums application.

Optionally, the third-party application makes a same response to the scrolling instruction. For example, the page 99 of the ebook is currently displayed, where the page 99 is the page I in FIG. 7. In response to the scrolling instruction, the page 98 of the ebook is flipped to, where the page 98 is the page II in FIG. 7. In response to the scrolling instruction again, a page 97 of the ebook is flipped to, where the page 97 is the page III in FIG. 7. It can be learned that the content newly added to the page II relative to the page I is content with the height of the touchscreen in portrait mode, content newly added to the page III relative to the page II is also content with the height of the touchscreen in portrait mode. Therefore, the third-party application makes the same response to the scrolling instruction. Alternatively, the newly added content may be adjusted to content of a half, 75%, or the like of the height of the touchscreen in portrait mode. Similarly, the third-party application also makes a same response to the rightward scrolling instruction or the leftward scrolling instruction. It may be understood that the third-party application, the terminal, or the like may respond to the scrolling instruction in a fixed manner each time the scrolling instruction is sent. Scrolling upward, downward, leftward, or rightward for a fixed distance is performed on the third-party application or the terminal. For example, the fixed distance may be a fixed height, or may be a fixed data size, or a page may include a fixed quantity of words.

The following describes impact of an operation on the scrolling instruction, where the operation is performed by the user on a user interface. In an optional implementation, for the translation application, regardless of force strength and a distance of an upward sliding operation 606 performed by the user on the interface of the translation application, provided that the user performs the upward sliding operation once, the system service module sends a scrolling instruction in response to the upward sliding operation once, so that a scrolling distance is fixed. This is also applicable to a downward sliding operation, a leftward sliding operation, a rightward sliding operation, a page flip operation, or the like. In another optional implementation, in response to the scrolling instruction, the scrolling instruction may alternatively be adjusted based on an upward sliding operation of the user. For example, content that is newly added to a next page in response to the scrolling instruction is adjusted based on force strength or a distance of the upward sliding operation of the user. For example, when the page VI' is displayed on the touchscreen for the translation application, the user performs an upward sliding operation with low force strength on the current interface. In response to the upward sliding operation of the user, the system service module adjusts the scrolling instruction, and responds to an adjusted scrolling instruction, so that the third-party application applies to the third-party application server for obtaining to-be-displayed content newly added to a page VIII, where the to-be-displayed content includes 80% of content of a page VII. This is also applicable to a downward sliding operation, a leftward sliding operation, a rightward sliding operation, a page flip operation, or the like.

In response to the scrolling instruction, the content newly obtained by the terminal may be recommended by the terminal manufacturer or the developer of the translation application, or may be set by the user, for example, set through selection by using a corresponding control in a setting option of the translation application on the terminal.

In an optional implementation, each picture sent by the terminal includes a translation request corresponding to the picture. Alternatively, when the terminal sends to-be-translated content to the translation server 403, a corresponding translation request may be included (for example, in FIG. 8, a translation request is included when the page I and the page II are sent, and a translation request is also included when the page III is sent). Alternatively, the terminal may send the translation request when the terminal sends to-be-translated content for the first time in response to the first touch operation of the user. When the translation server performs translation, a target language is a target language included in the translation request, until the user exits the translation application.

In an optional implementation, the user may return to view any translation result that has been displayed. For example, when the terminal displays the page IV', the user performs a downward sliding operation on the touchscreen, and in response to the downward sliding operation, the user may return to any location on the page III', the page II', or the page I' for viewing.

In an optional implementation, force strength and distances of upward sliding operations 606 are different for different users or even for a same user at different time. In some embodiments of this application, regardless of force strength and a distance of an upward sliding operation performed by the user on an interface in which content of a translation result is displayed, the terminal may respond to each upward sliding operation 606 of the user in a fixed manner. For example, content of a translation result displayed by the terminal is scrolled upward by a fixed height in response to each upward sliding operation performed by the user on an interface in which the content is displayed. In the example shown in FIG. 7, the fixed height is a height of the gray area 702, that is, close to a height of the entire screen in portrait mode. Based on this setting, the user can enable the terminal to display newly translated content each time. Each upward sliding operation of the user enables the terminal to display both new content of a translation result and a part of content of a displayed translation result, so that displayed content is continuous, and coherence between translated content is improved. To be specific, the fixed height may be less than the height of the gray area 702, as shown in FIG. 7. The following describes, with reference to the accompanying drawings, how to determine the fixed height and how to determine a next page whose content is continuous with the currently displayed content.

It is assumed that a height of newly-added to-be-displayed content on the touchscreen is L in response to an upward sliding operation 606 of the user. In this case, the newly-added to-be-displayed content needs to include at least one more line of text, to ensure that content sent by the terminal for translation includes newly added content. Big data statistics are performed on one line of text displayed on touchscreens when most common applications on smartphones commonly used in the market are started, and a height of one line of text is obtained to be about 50 to 80 pixels. Therefore, L is greater than 80 pixels. The height L of the newly-added to-be-displayed content on the touchscreen is less than a height H of the touchscreen in portrait mode, to ensure that content displayed by the terminal is continuous without a skipping line.

Figure 9A:
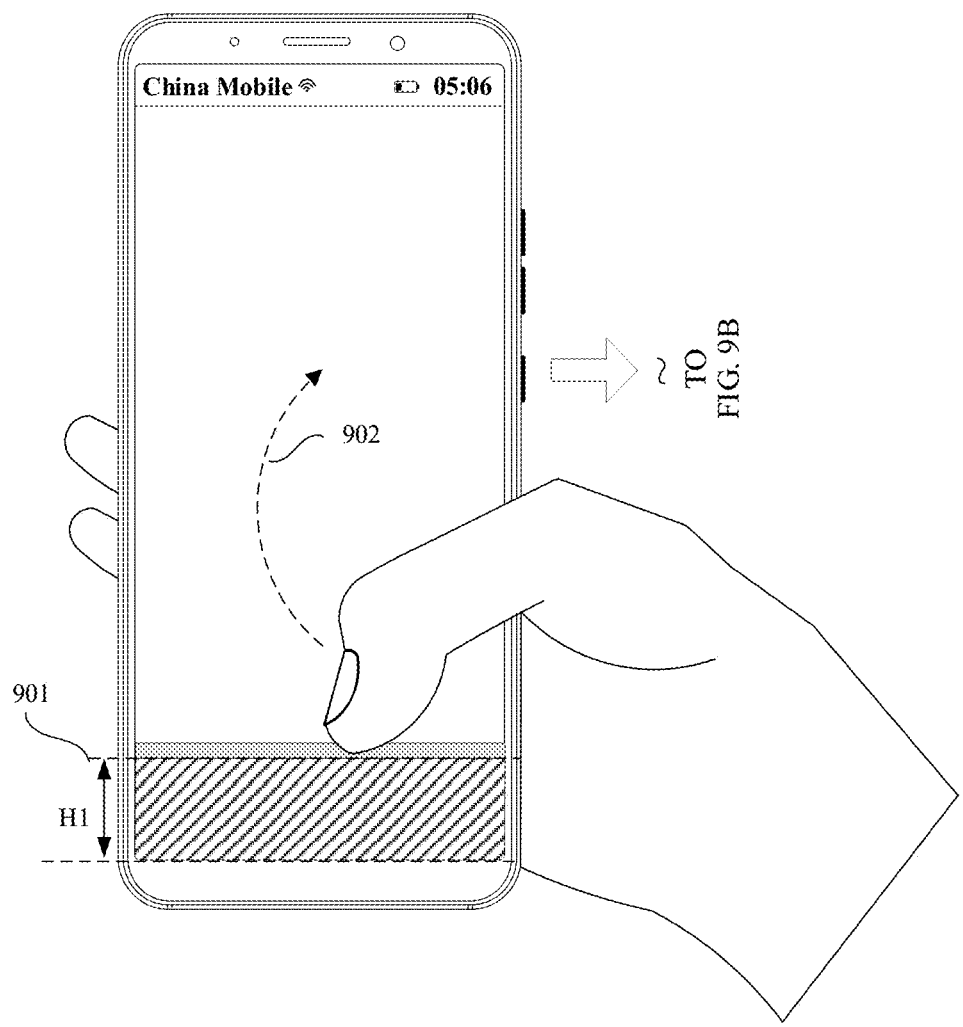
FIG. 9A and FIG. 9B are schematic diagrams for human-computer interaction according to an embodiment of this application.
Figure 9B:
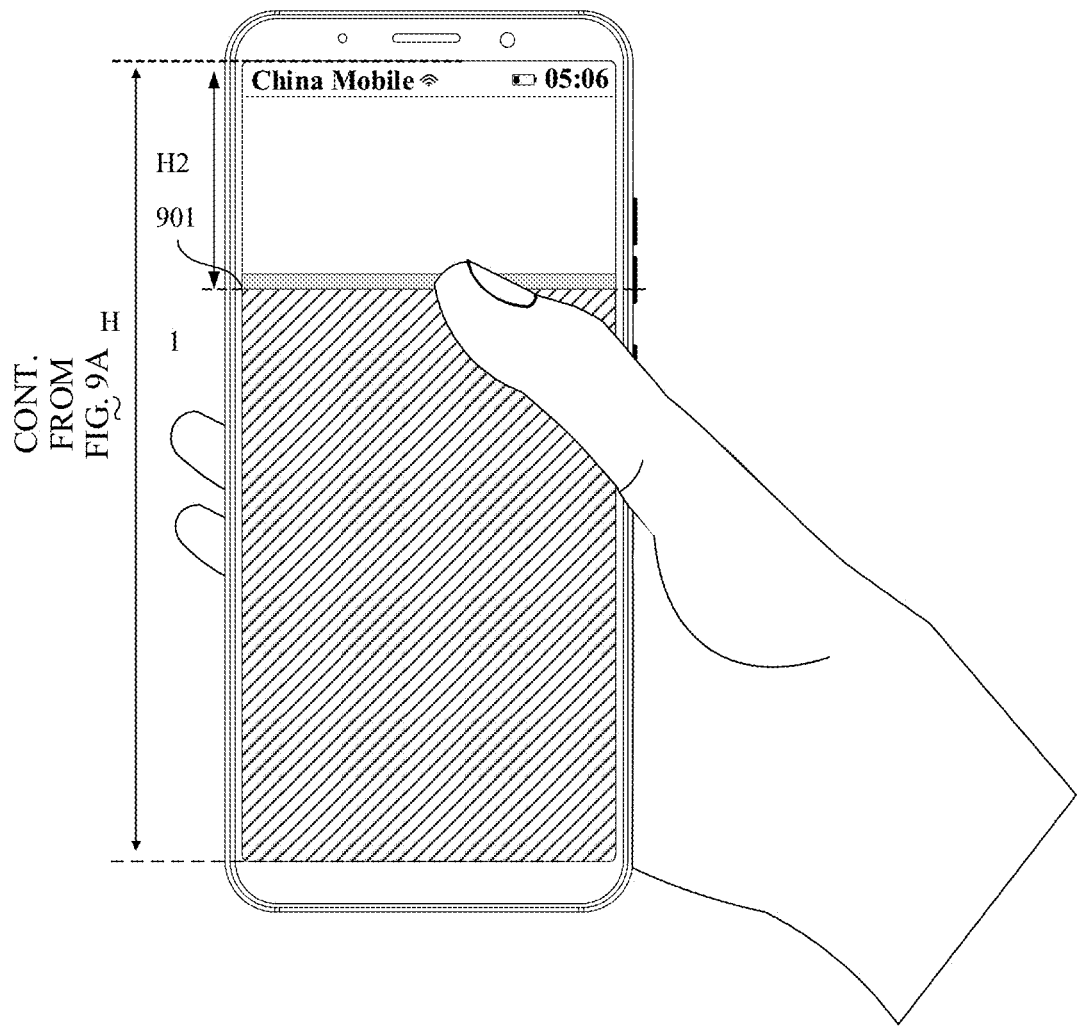

An operation habit of the user and operation sensitivity of the terminal are taken into consideration. As shown in FIG. 9A and FIG. 9B, FIG. 9A and FIG. 9B are diagrams of interfaces for a sliding operation of a user. When the user holds a mobile phone with one hand, 901 in FIG. 9A indicates one line that has a distance of H1 to the bottom of the screen and whose height is 1 pixel, where H1 is a distance between a start location of a finger and the bottom of the screen during a sliding operation. When the right thumb of the user slides upward along a track 902, 901 is moved to a location at which a distance to the top of the screen is H2, where H2 is a distance between an end location of the finger and the top of the screen during the sliding operation. Content displayed by the terminal is scrolled upward by a fixed height of H−H1−H2 in response to the upward sliding operation of the user. Both H1 and H2 are in a unit of pixels, and both H1 and H2 are greater than 0 pixels and less than the height H of the touchscreen in portrait mode. Optionally, the height by which the content displayed by the terminal is scrolled upward is the same as a height of new content obtained by the terminal in response to the scrolling instruction. In this case, in response to the upward sliding operation of the user, the terminal may display just one pretranslated page.

Figure 10:
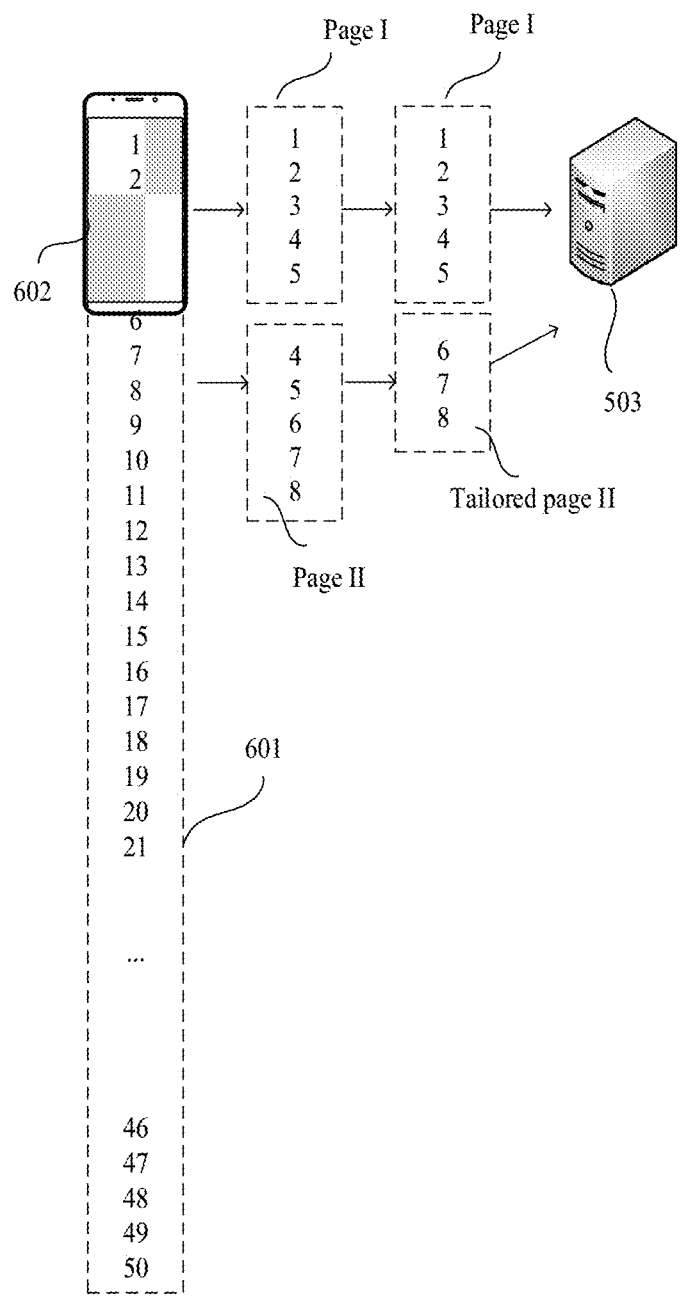
FIG. 10 is a schematic diagram of a content translation method according to an embodiment of this application.

In another implementation, in FIG. 7, the height of the content that is newly added to the page II relative to the page I in response to the scrolling instruction is the height H of the touchscreen in portrait mode. Alternatively, the height of the content that is newly added to the page II relative to the page I in response to the scrolling instruction is in a first proportion to the height H of the touchscreen in portrait mode. For example, the first proportion is 60%. As shown in FIG. 10, content of a page I is "1, 2, 3, 4, 5", and 60% of to-be-displayed content of a page II is newly added. In this case, content of the page II is "4, 5, 6, 7, 8". If the page II is directly sent for translation, a waste of resources is caused. Therefore, after removing same content "4, 5" from the page II, the terminal obtains a tailored page II including content "6, 7, 8". The terminal sends the page I and the tailored page II to the translation server 403 for translation, and content of the page I and content of the tailored page II are still continuous. The terminal receives translation results returned by the translation server 403, displays a page I' including "1', 2', 3', 4', 5'" on a touchscreen, and stores a page II' in the buffer area. The touchscreen detects an upward sliding operation 606 of the user, displays "4', 5', 6', 7', 8'" on the touchscreen in response to the upward sliding operation of the user, and sends a tailored page III to the translation server 403. Then, translation is performed by using a method the same as the method used for the tailored page II, and the rest may be deduced by analogy. Details are not described herein.

Optionally, in to-be-translated content, the terminal modifies the page II to the tailored page II, modifies the page III to the tailored page III, and then sends the tailored page II and the tailored page III to the translation server. Alternatively, another implementation may be used. For example, the terminal directly sends the page II and the page III to the translation server. After obtaining a page II' and a page III', the terminal respectively modifies the page II' and the page III' to a tailored page II' and a tailored page III', and displays the tailored page II' and the tailored page III' on the touchscreen. The same method is used for a page IV, and the rest may be deduced by analogy. Details are not described herein.

During removal of the same content, the system service module of the terminal may remove the same content by comparing same texts or by performing pixel-by-pixel comparison on pictures.

During obtaining the 60% newly-added to-be-displayed content of the page II, the system service module of the terminal may obtain the 60% newly-added content through a request to a third-party server. Alternatively, the terminal may obtain, through a request to a third-party server, content that is newly added by a height of one screen in portrait mode, then select 60% of the content, and store remaining 40% of the content in the system service module. Alternatively, another manner may be used. This is not limited in this application.

In another implementation, in this embodiment of this application, the same content between the page I and the page II not only includes same body content that needs to be translated, for example, content "4, 5" of the page II in FIG. 10 and "1, 2, 3, . . . , 50" in FIG. 8, but also includes non-body content such as the navigation bar, the comment bar, and the advertisement bar. If to-be-translated content includes content such as the navigation bar, the comment bar, and the advertisement bar when being sent for translation, the terminal displays the foregoing content when the terminal displays a translation result of each obtained picture on the touchscreen. Therefore, the foregoing content is displayed for a plurality of times. This affects user experience. In addition, if the foregoing content is translated for a plurality of times, a waste of resources is caused. Optionally, the foregoing content may be tailored before being sent for translation, to remove redundant content.

The interface of the CHINA DAILY application is still used as an example, as shown in FIG. 5A. A case that same content between two adjacent pages, the navigation bar, the comment bar, the advertisement bar, and the like are removed is described. The page I is the same as the page I in FIG. 5A. There is a same case in FIG. 10. A height of the page II is the same as a height of the page I, content of the page I is continuous with body content of the page II, and the two pages have same body content. A difference in FIG. 11A to FIG. 11C is The page II and the page I further have same non-body content such as the navigation bar, the comment bar, and the advertisement bar.

Figure 11A:
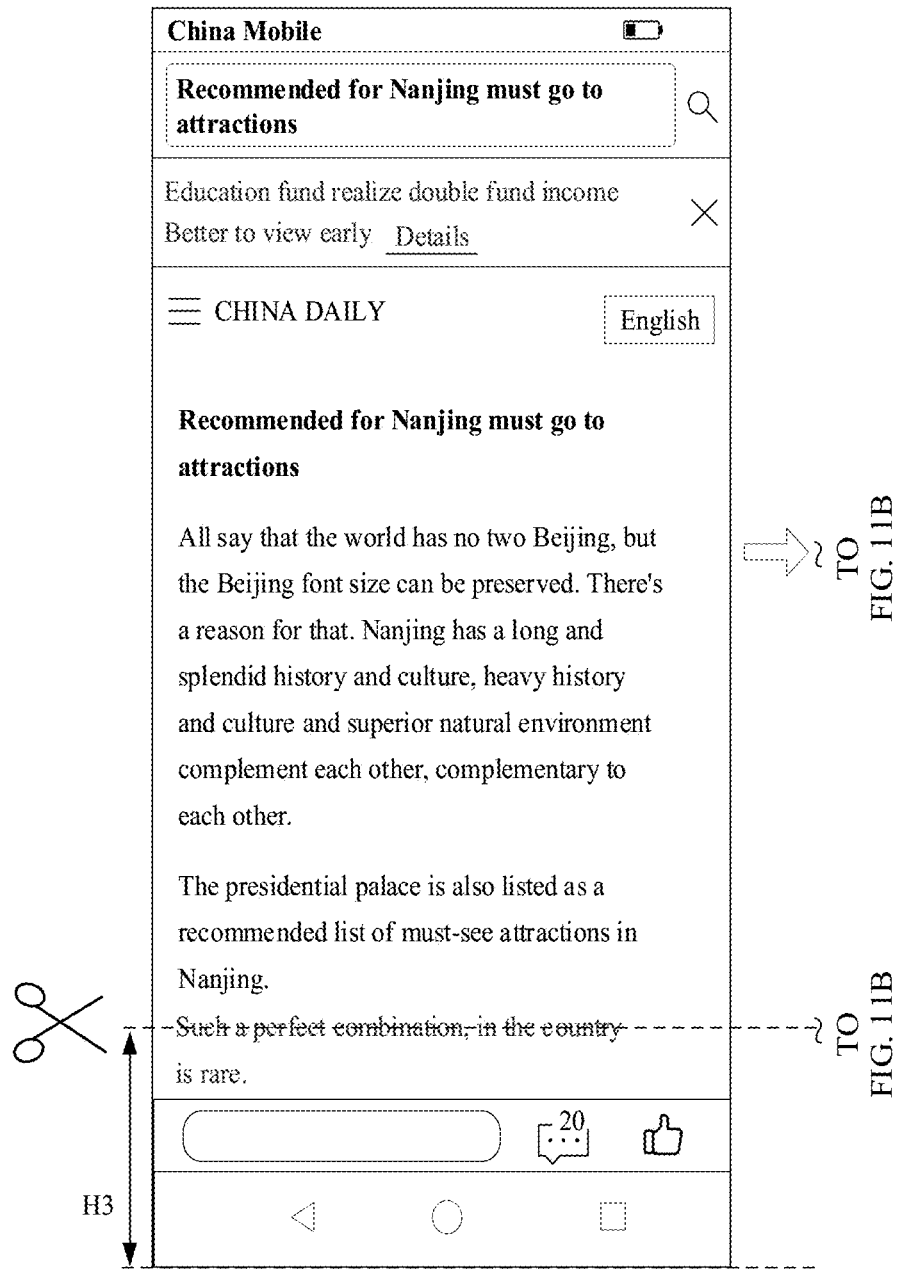
FIG. 11A, FIG. 11B, and FIG. 11C are a schematic diagram of a content translation method according to an embodiment of this application.
Figure 11B:
Figure 12A:
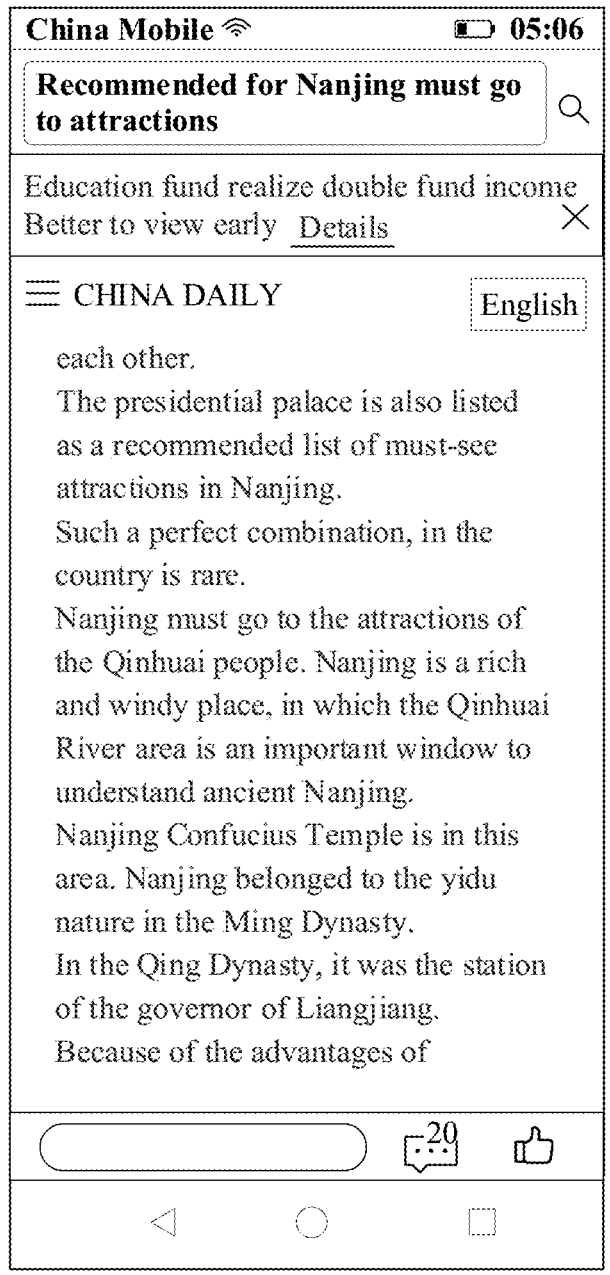
Figure 12B:
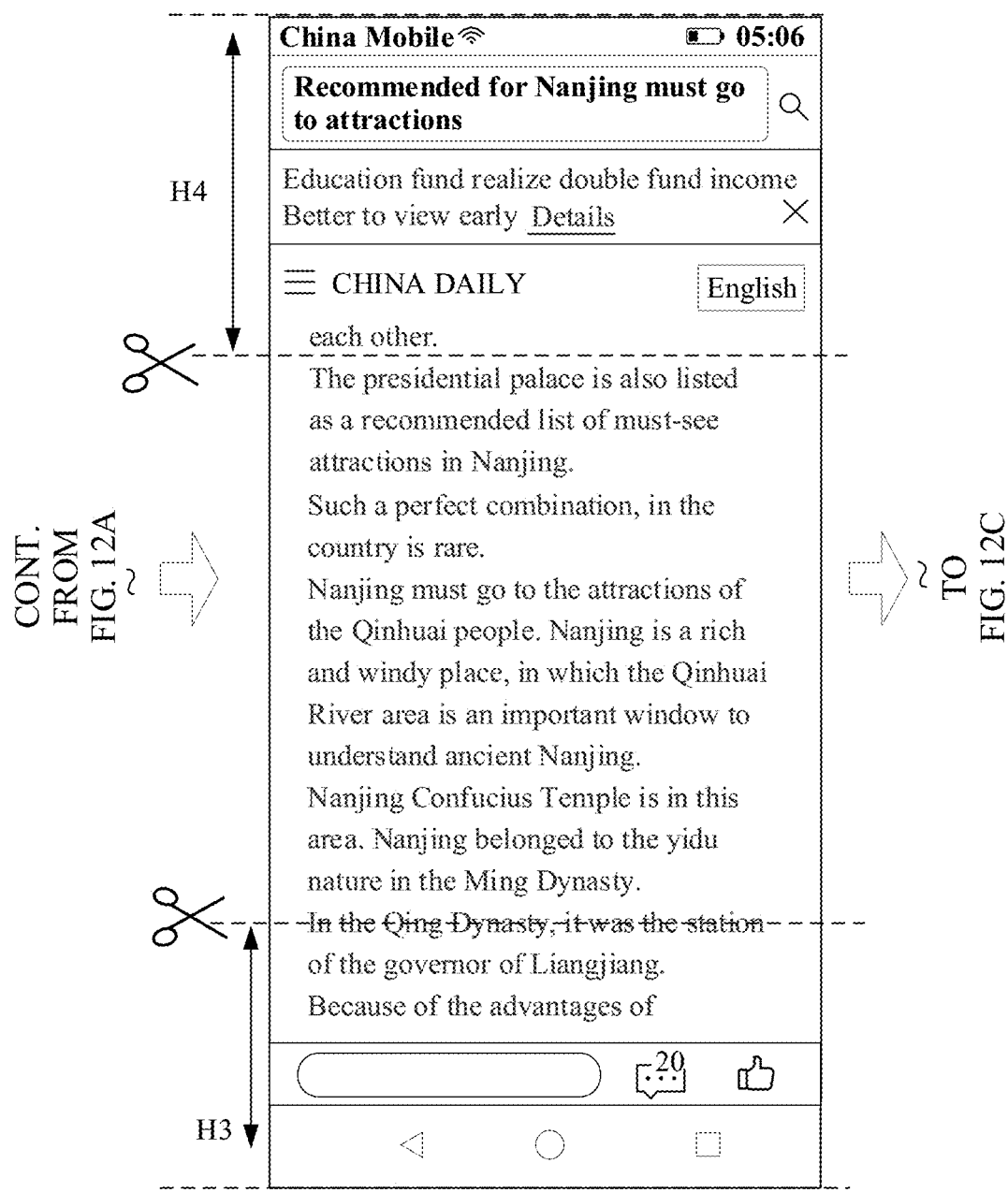
Figure 12D:
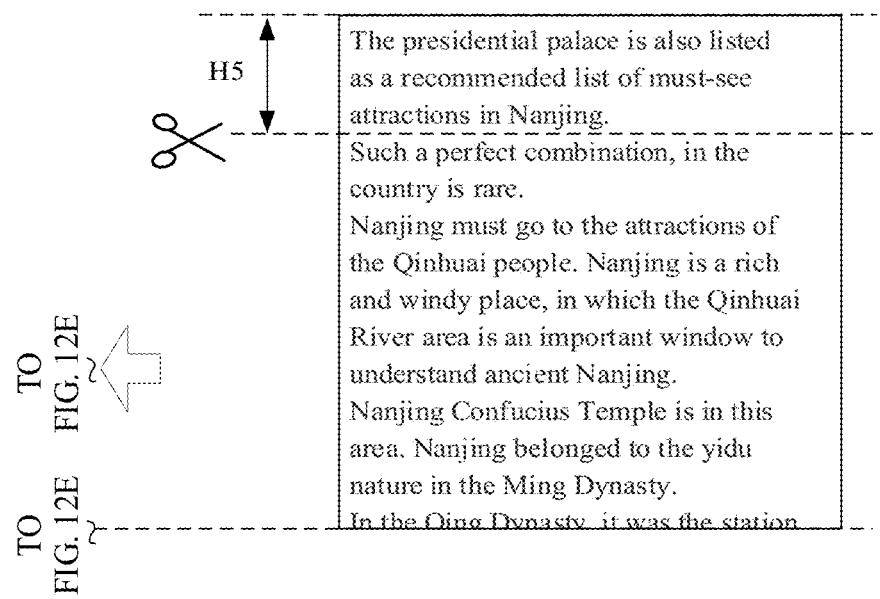
Figure 12E:
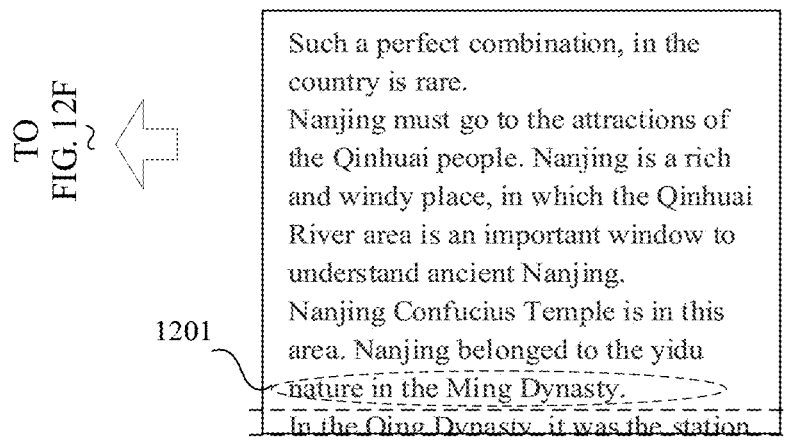

For a line of text 1102 in FIG. 11B or 1202 in FIG. 12E, only a part of the line of text in a height direction is displayed. In other words, the line of text is incomplete, and does not belong to a case of a line of complete text represented in this embodiment of this application. 1101 in FIG. 11B and 1202 in FIG. 12E each are displayed as a line of complete text in the height direction, and belong to the case of a line of complete text represented in this embodiment of this application. A height H5 of same content is used to represent a height of same content between two consecutive pages (for example, the page I and the page II, or the page II and the page III), and H5 is in a unit of pixels. The following describes a tailoring operation process by using a logical page I and a logical page II as an example.

Figure 11C:
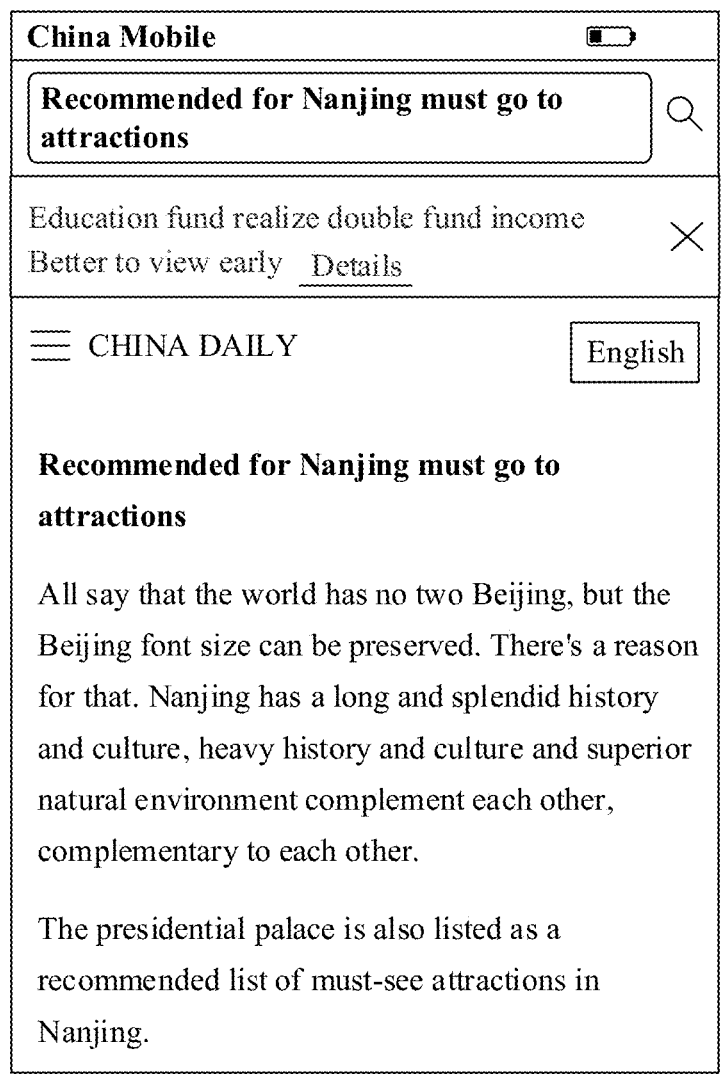

An operation of tailoring the page I to obtain the tailored page I includes the following process, as shown in FIG. 11A to FIG. 11C.

I. Tailor a picture in FIG. 11A by a height of H3 at the bottom, to obtain a picture of the page I without the bottom shown in FIG. 11B.

II. Perform OCR recognition on the picture of the page I without the bottom, and retain the line of complete text 1101 that can be recognized through OCR at the bottom of the picture.

III. Remove an area under the line of complete text 1101, to obtain a page I shown in FIG. 11C.

The OCR recognition method belongs to the conventional technology, and a location of the last line of complete text in the picture may be determined by using this method. OCR recognition may be replaced with an image recognition manner. To be specific, from bottom to top, if an entire line with a height of 1 pixel is white, it is considered that a text above the line is complete, or if an entire line with a height of 1 pixel includes black, it is considered that the line of text is incomplete, and recognition is continued upward until an entire line with a height of 1 pixel is white.

A value of H3 may be a fixed value and obtained through collection of heights of non-body content, such as the navigation bar 502, the comment bar 511, the advertisement bar, and the search bar in FIG. 5A, that is repeatedly displayed close to the bottom of each user interface when most common applications on smartphones commonly used in the market are started. H3 may be any value between 300 and 450 in a unit of pixels, including 350 pixels, 380 pixels, 400 pixels, 430 pixels, or the like. Alternatively, the system service module of the terminal may recognize the picture, and remove the picture by the height of H3 after determining that the height of H3 is a height of non-body content.

An operation of tailoring the page II to obtain the tailored page II includes the following process, as shown in FIG. 12A to FIG. 12F.

I. Tailor a picture in FIG. 12A by H4 at the top and H3 at the bottom, as shown in FIG. 12B, to obtain a picture of the page II without the top and the bottom in FIG. 12C. In this step, the top may be removed first and then the bottom may be removed, or the bottom may be removed first and then the top may be removed.

II. Compare the picture of the page II without the top and the bottom in FIG. 12C with the picture of the page I in FIG. 11C by using a line-by-line pixel comparison method, to obtain the height H5 of same content, as shown in FIG. 12D.

III. Tailor the picture of the page II without the top and the bottom by H5 from top to bottom, as shown in FIG. 12D, to obtain a picture of the page II without the height H5 of same content, as shown in FIG. 12E.

V. Perform OCR recognition on the bottom of the picture of the page II without the height H5 of same content, and retain a line of complete text, such as 1201 in FIG. 12E, that can be recognized through OCR.

VI. Remove an area under the line of complete text 1201, as shown in FIG. 12E, to obtain a page II shown in FIG. 12F.

A value of H4 may be a fixed value and obtained through collection of heights of non-body content, such as the navigation bar, the comment bar, the advertisement bar 510 in FIG. 5A, and the search bar 504 in FIG. 5A, that is repeatedly displayed close to the top of each user interface when most common applications on smartphones commonly used in the market are started. H4 may be any value between 350 and 500 in a unit of pixels, including 380 pixels, 400 pixels, 430 pixels, 450 pixels, or the like. H4 and H3 may be the same or different. Alternatively, the system service module of the terminal may recognize the picture, and remove the picture by the height of H4 after determining that the height of H4 is a height of non-body content. The line-by-line pixel comparison method belongs to the conventional technology. This method is a method for obtaining same content between pictures by performing line-by-line pixel comparison, and is commonly used in the picture splicing field. In this embodiment of this application, the method is used to obtain a height H5 of same content between two adjacent pictures, where the height is in unit of pixels. A previous page (for example, the page I) on which comparison is performed ends with a line of complete text obtained through OCR recognition, and the picture of the second page without the height H5 of same content also starts with a line of complete text. This ensures translation accuracy, and improves user experience. A tailoring operation process for the page III, the page IV, or the like is similar to the tailoring operation process for the page II. Details are not described herein again.

In the entire translation process, if the height H5 of same content has a quite large value, little content of each page is to be buffered, little content is to be updated and displayed for the user each time, and interaction needs to be performed between the terminal and the translation server for a plurality of times to complete translation of the news. Consequently, a waste of resources is caused. If the height H5 of same content has a quite small value, translated content may be incoherent because quite much content is tailored. Therefore, a proportion of content that is newly added to a next page in response to the scrolling instruction is to be adjusted to falling within a proper value range, so that a height of each page sent for translation falls within a proper range. This avoids a problem of a waste of resources or incoherence in translated content caused because tailoring is performed for quite a lot of times.

The tailored heights H3 and H4 are obtained through collection of common values of most applications on smartphones commonly used in the market. For some third-party applications, H3 has quite a lot of possible values. In this case, a line of incomplete text may be removed by using the OCR recognition technology, to retain a complete text. This ensures translation accuracy, and improves user experience. In addition, there is same content between two consecutive pages, and the same content is recognized and tailored by using the pixel-by-pixel comparison method. This ensures that no same content is repeatedly translated and no waste of resources is caused. When the terminal receives translation results and displays the translation results, content of the translation results is coherent without same translated content, so that the user has good reading experience.

Figure 13:
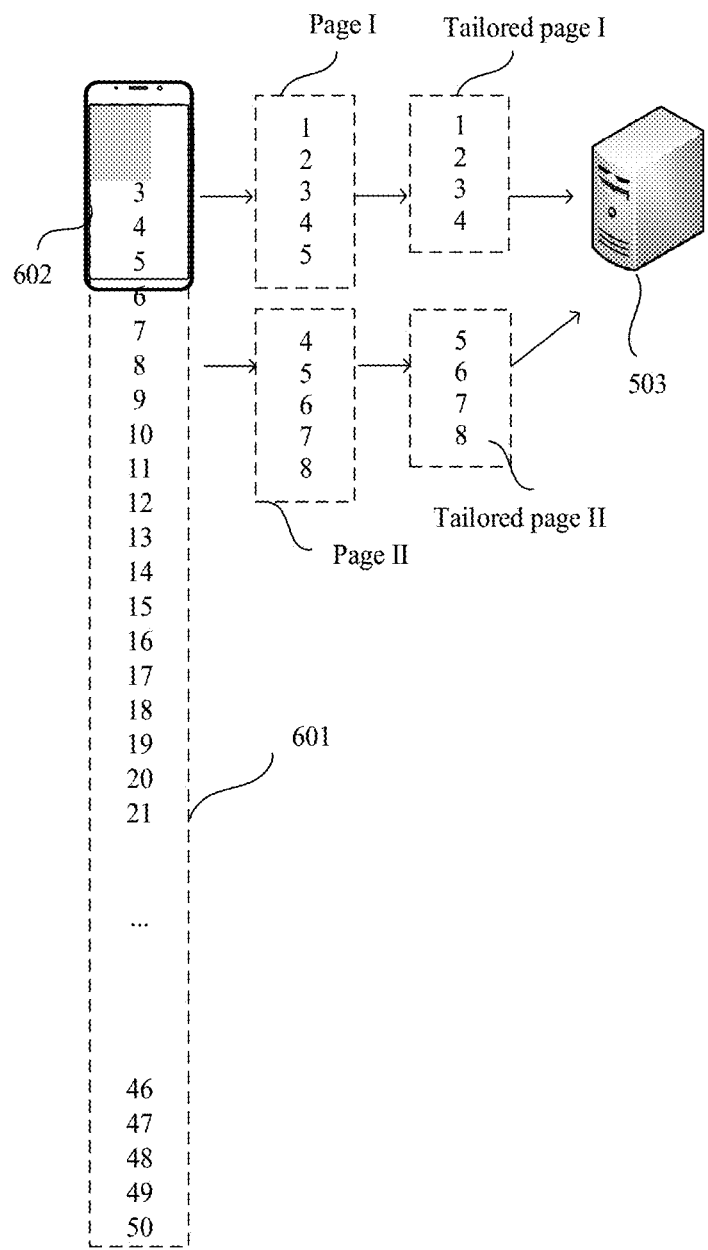
FIG. 13 is a schematic diagram of a content translation method according to an embodiment of this application.

Based on the foregoing case, FIG. 13 is a scenario diagram of a translation process according to another embodiment of this application. This translation process is similar to the process in FIG. 10, and a difference lies in a manner of processing each page. After a tailoring operation is performed on a page I, a tailored page I including content "1, 2, 3, 4" is obtained. A page II includes content "4, 5, 6, 7, 8", and has the same content "4" as the tailored page I. The terminal removes the same content "4" to obtain a tailored page II including content "5, 6, 7, 8". The terminal sends the tailored page I and the tailored page II to the translation server 403 for translation, where content of the tailored page I and content of the tailored page II are continuous. The terminal receives translation results returned by the translation server 403, displays a page I' including "1', 2', 3', 4'" on a touchscreen, and stores a page II' in the buffer area. The touchscreen detects an upward sliding operation 606 of the user. In response to the upward sliding operation of the user, the terminal displays "4', 5', 6', 7', 8'" on the touchscreen, and the terminal performs tailoring processing on a page III, to obtain a tailored page III, and sends the tailored page III to the translation server 403. A tailoring method for the page III is the same as that for the page II, and translation is performed subsequently by using the same method. The rest may be deduced by analogy. Details are not described herein again.

It should be noted that, in this embodiment, if the tailored page II includes a picture, for example, a location of the picture on the tailored page II may be recorded, so that the picture is put back to the original location after the page II' is received. Alternatively, after receiving the page II', the terminal may fill non-body content (such as the advertisement bar and the comment bar) in the original location, to present to the user an experience effect that a new application is not switched to and the user is still viewing the original third-party application, for example, the CHINA DAILY application. The terminal may also fill the foregoing translation results in corresponding locations, to achieve a technical effect that the translation results are continuous.

The terminal pretranslates a next page, and stores a translation result. When the user performs an upward sliding operation, the terminal displays the translation result of the next page to the user, so that the user does not need to wait. In this way, human-computer interaction efficiency and user experience are improved. The user only needs to slide upward, and can smoothly browse subsequent translated content of the article. In addition, the terminal pretranslates one next page instead of pretranslating content of all remaining pages. This can prevent unnecessary resource consumption in a case, for example, in which the user only wants to translate the first several pages but does not want to translate all pages.

In most scenarios such as a news browsing scenario or a scenario in which communication is performed through a social application, an amount of to-be-translated content is limited. When the terminal displays a page P', the terminal determines whether a page (P+1) logically to be displayed is the last page. If a page P is the last page, the terminal does not need to send the page (P+1) for translation. If the page P is not the last page, the terminal needs to send the page (P+1) for translation.

In an optional implementation, that the terminal performs the determining in the tailoring operation process for the page II is used as an example for description based on FIG. 12D. As shown in FIG. 14, a height H5 of same content is obtained through pixel-by-pixel comparison, and a height H6 represents a height of the obtained picture of the page II without the top and the bottom in FIG. 12D. The terminal may perform the determining based on a ratio of the height H5 of same content to the height H6 of the picture of the second page without the top and the bottom. A larger ratio of H5/H6 indicates that the page II includes more same content relative to the page I. When the ratio is greater than a first threshold, it may be considered that the page I is the last page, and the terminal does not need to send the page II to the translation server for translation. A plurality of tests is performed based on smartphones commonly used in the market, and the first threshold is determined to be any value ranging between 85% and 100%, for example, 90% or 95%.

In another optional implementation, a method for determining whether to buffer the next page may alternatively be as follows. As shown in FIG. 14, a smaller value of (H6−H5) indicates that the page II includes more same content relative to the page I. When (H6−H5) is less than a second threshold, it may be considered that the page I is the last page, and the terminal does not need to send the page II to the translation server for translation. Values of heights of fonts in most applications are collected based on smartphones commonly used in the market. The height of the font basically ranges between 50 pixels and 80 pixels. Based on an error, the second threshold is determined to be any value ranging between 0 pixels and 100 pixels, for example, 50 pixels or 80 pixels.

In this way, when the terminal displays the page P', the terminal may determine, based on the foregoing determining, whether to continue to send the page (P+1) to the translation server for translation. This setting ensures that the terminal does not repeatedly send same content for translation, so that a waste of resources is not caused.

Figure 15:
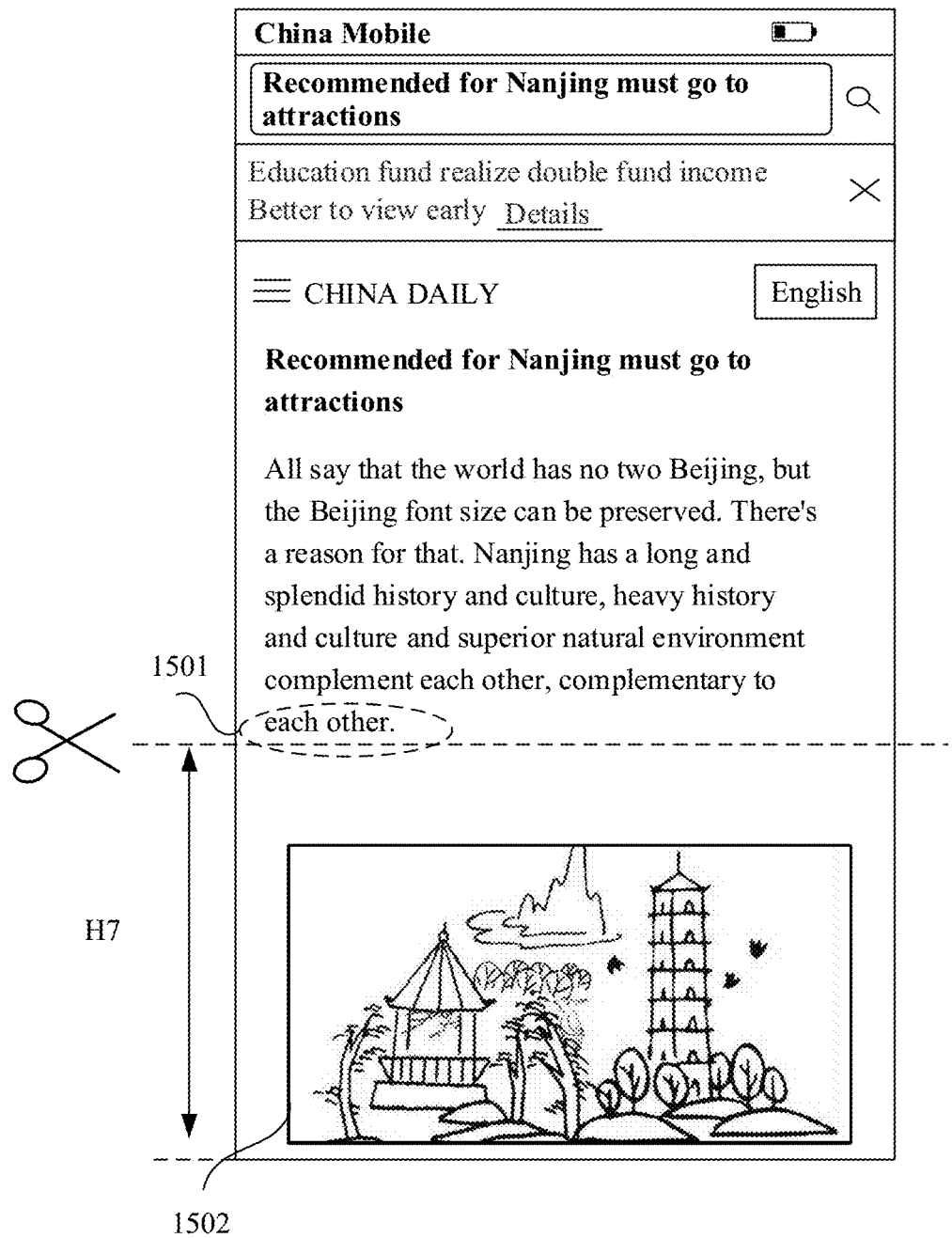
FIG. 15 is a schematic diagram of a content translation method according to an embodiment of this application.

In many cases, a to-be-translated page includes a picture. As shown in FIG. 15, when a line of complete text 1501 is obtained through OCR recognition, if an area under the line of complete text 1501 is removed, a removed picture 1502 is used as a next page and sent to the translation server, and a current page to be sent to the translation server includes very little content. Consequently, a waste of resources is caused.

In an optional implementation, as shown in FIG. 15, after OCR recognition, the terminal determines whether a distance H7 between the bottom of the line of complete text 1501 and the bottom of the touchscreen is greater than a third threshold, to avoid the foregoing problem. If H7 is greater than a third threshold, the area under the line of complete text is retained. If H7 is less than a third threshold, the area under the line of complete text 1501 is removed. Based on smartphones commonly used in the market, a height of a text of a commonly used application ranges between 50 pixels and 80 pixels. Therefore, the third threshold is set to at least twice the height of the text. For example, the third threshold is any value ranging between 100 and 250 in a unit of pixels, including 150 pixels, 200 pixels, or 250 pixels.

In the foregoing embodiment, to improve controllability experience of the user, the user may tap the return button 505 on the toolbar shown in FIG. 5A at any moment, and the terminal returns to the to-be-translated news page in response to the operation of the user.

In this embodiment of this application, the first threshold, the second threshold, and the third threshold may be preconfigured in the translation application, or may be manually modified by the user.

Figure 16:
FIG. 16 is a schematic diagram of human-computer interaction according to an embodiment of this application.

In some embodiments of this application, when the terminal has not buffered the next page, if the user performs a quick upward sliding operation on the touchscreen, the terminal cannot display translated content on the touchscreen in a timely manner. In this case, the user needs to wait for the terminal to display the translated content. The terminal may display, to the user, a prompt message indicating that the translated content is being loaded, to remind the user that the terminal is loading the translated content but is not in a case such as a crash. In this case, the user needs to wait for a short period. For example, as shown in FIG. 16, the terminal may remind the user "Loading more translated content" in a form of a floating window 1601 on an interface currently output by the system, and display a running identifier 1602. In some embodiments, another floating window may be added to display an animation effect or other interesting content, to distract attention of the user and relieve boredom of the user. In this way, the user can learn of a status of the terminal based on the prompt of the terminal, and user experience is improved.

Figure 17:
FIG. 17 is a schematic diagram of human-computer interaction according to an embodiment of this application.

In some embodiments of this application, the next page fails to be pretranslated due to a reason such as a poor signal or a condition of the terminal. When the terminal detects that the next page is not stored in the buffer area, the terminal may display a prompt message to the user, to display a buffer failure. For example, as shown in FIG. 17, the terminal may remind the user "Loading fails" in a form of a floating window 1701 on an interface currently output by the system. In some embodiments, the user may be reminded to slide upward to reload a buffer. In this case, that the terminal displays the page II' is used as an example for description. If the page III' fails to be stored, a reason is, for example, a poor network signal when the page III is sent for translation or a poor signal when the page III' is returned. As a result, the page III' is not stored in the buffer area. In response to the upward sliding operation of the user, the terminal re-sends the page III to the translation server for translation, and also sends the page IV to the translation server for translation. When the translation server returns a translation result, the terminal needs to determine whether the page III' is returned. If the page III' is returned, the terminal displays the page III' on the touchscreen. If a page IV' is returned, the terminal stores the page IV' in the buffer area. This saves time of the user, and improves user experience.

Figure 18:
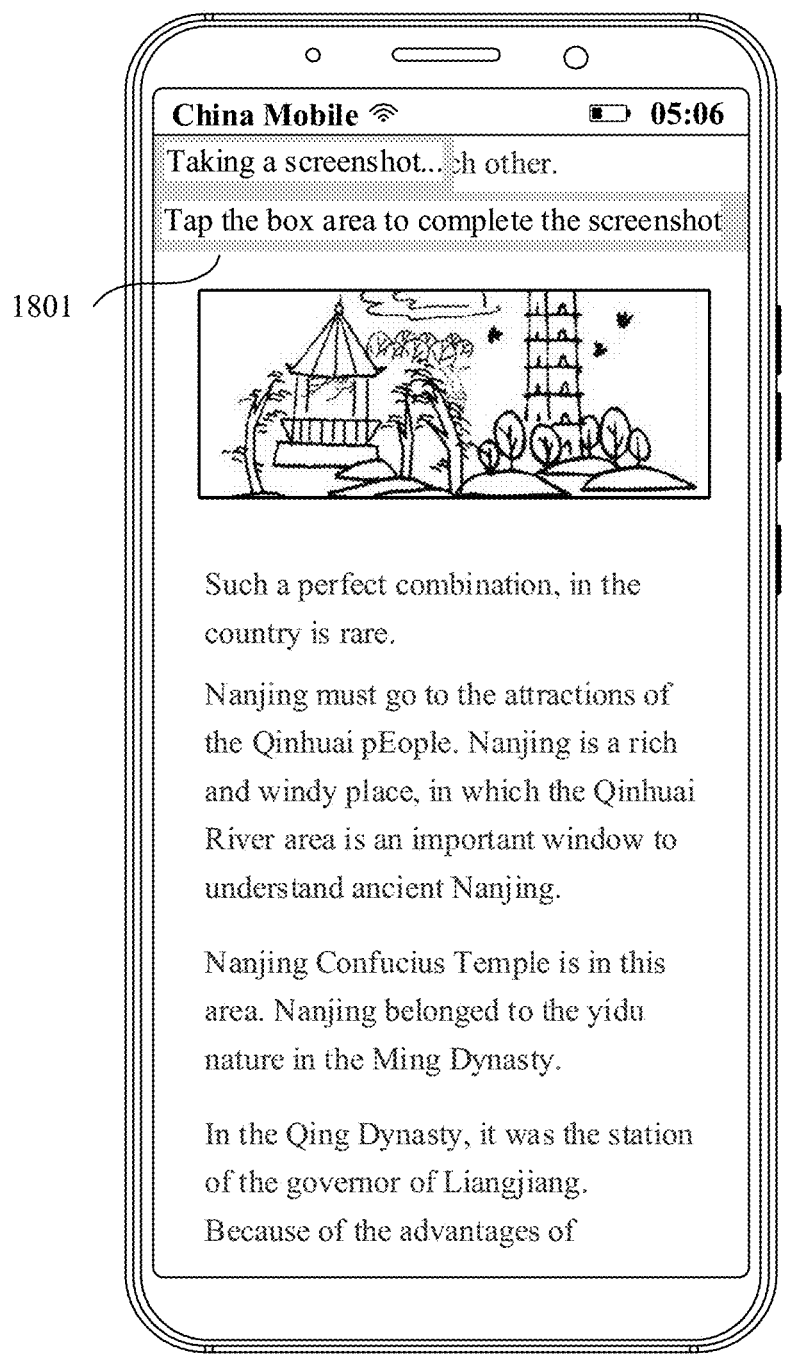
FIG. 18 is a schematic diagram of human-computer interaction according to an embodiment of this application.

In some embodiments of this application, the user may select a to-be-translated area. For example, a box for tailoring is displayed on the touchscreen, and a size of a large screenshot is adjusted by adjusting a size of the box. For example, the user may select to start scrolling at a start location of the large screenshot, and end the large screenshot by stop scrolling at a desired location. When to-be-translated content is relatively long, the user can autonomously select a to-be-translated area. In this way, a strong sense of control is provided for the user, and user experience is also improved. For example, as shown in FIG. 18, the user does not find the function by reading use instructions. However, the terminal may remind the user on the touchscreen about a specific operation manner. As shown in FIG. 18, the terminal may remind the user "Taking a screenshot . . . Tap the box area to complete the screenshot" in a form of a floating window 1801 on an interface currently output by the system, to remind the user about the specific operation manner. For a method for translating the large to-be-translated screenshot, refer to a corresponding process in the foregoing method embodiment. Details are not described herein again. In this way, the user has strong controllability experience and good user experience, does not need to end translated content in a return manner, and can determine to-be-translated content before translation. In addition, resources are not wasted on translating content that is unnecessary or unimportant to the user.

Optionally, when the terminal detects that a language used in the user interface is not a language selected on the terminal during system setting, a dialog box, for example, a floating window, may be automatically popped up, to ask the user whether to start the translation application. Then, the translation application is started.

Alternatively, the translation application may be started in another user interface. For example, the user starts a chat application, and French content is displayed in a user interface of the chat application. The touchscreen detects a first gesture operation of the user in the user interface of the chat application, and the terminal may translate French into Chinese in response to the first gesture operation of the user. For specific descriptions, refer to the descriptions in the foregoing embodiments. For another example, the user starts a shopping application, and Japanese content is displayed in a user interface of the shopping application. The touchscreen detects a first gesture operation of the user in the user interface of the shopping application, and the terminal may translate Japanese into Chinese in response to the first gesture operation of the user. For specific descriptions, refer to the descriptions in the foregoing embodiments. For still another example, the user travels to Germany, and starts a Maps application or a web page through another browser, and German content is displayed in a user interface. The touchscreen detects a first gesture operation of the user, and the terminal may translate German into Chinese in response to the first gesture operation of the user. For specific descriptions, refer to the descriptions in the foregoing embodiments.

Therefore, the translation method is more widely applied, and is not limited to being applied to a scenario in which the user needs to use a browser to view news, but may also be applied to a scenario in which the third-party application is used.

The translation server in all the foregoing embodiments of this application includes a cloud translation server. In some embodiments of this application, the terminal may also include a translation module. The translation module replaces the translation server to translate to-be-translated content. After translation is completed, the translation module returns a translation result to the system service module, so that the terminal can display the translation result to the user.

Figure 19:
FIG. 19 is a schematic diagram of human-computer interaction according to embodiments of this application.

In some embodiments of this application, as shown in FIG. 19, when the translation application is used, the terminal may detect a language included in to-be-translated content, to determine a source language corresponding to the to-be-translated content. A source language 1901 in FIG. 19 is automatically detected. An arrow 1903 indicates a translation direction from the source language 1901 to a target language 1902.

A language shown in the target language 1902 in FIG. 19 may be a language supported by the terminal, or may be a language supported by the translation server. For example, when the terminal translates content, if the terminal supports Chinese, English, Japanese, Korean, Spanish, French, Russian, German, Italian, Portuguese, or Arabic, the target language 1902 includes Chinese, English, Japanese, Korean, Spanish, French, Russian, German, Italian, Portuguese, or Arabic. For another example, when the terminal uploads the to-be-translated content to the translation server for translation, if the translation server supports Chinese, English, Japanese, Korean, Spanish, French, Russian, German, Italian, Portuguese, or Arabic, the target language 1902 includes Chinese, English, Japanese, Korean, Spanish, French, Russian, German, Italian, Portuguese, or Arabic. In some embodiments, when the user wants to use the translation application when using an application such as TWITTER, before the terminal uploads the to-be-translated content and a language set by using a target language setting button to the translation server, the terminal reminds the user whether to allow uploading of the to-be-translated content to the translation server, to ensure a right to know of the user. The terminal may remind, by displaying a dialog box on the touchscreen, the user whether to allow uploading of the to-be-translated content to the translation server, or may remind the user in another manner.

Optionally, the target language may alternatively be a target language latest recorded by the terminal, to improve translation flexibility. For example, if the target language latest recorded by the terminal is French, the target language is automatically set to French.

Figure 20:
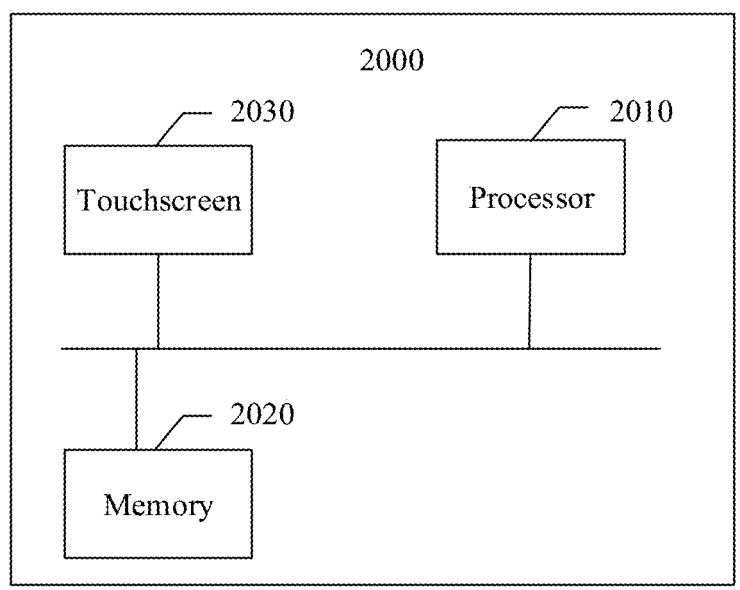
FIG. 20 is a schematic structural diagram of a terminal according to an embodiment of this application.

In some embodiments of this application, because a system language set on the terminal is usually a language most familiar to the user, the terminal may use the system language set on the terminal as the target language. The user may change the target language. As shown in FIG. 20, the user may change the target language in a user interface in which a translation result is displayed after translation, or may change the target language by using a target language setting control.

In addition, if the target language is a language supported by both the terminal and the server, for example, both the terminal and the server may support a language (for example, English) in a target language list, translation may be performed on the terminal, or may be performed on the server. In this case, the user may correspondingly set a translation priority.

In this way, controllability experience of the user is improved. The user can select the target language as required. Alternatively, the terminal directly chooses the target language used by the user last time. In this case, the user does not need to select the target language. This is simple and convenient, and improves user experience.

The foregoing embodiments in the embodiments of this application may be used in combination with each other.

In the embodiments provided in this application, the method provided in the embodiments of this application is described from a perspective of the terminal serving as an execution body.

FIG. 20 shows a terminal 2000 according to this application. For example, the terminal 2000 includes at least one processor 2010, memory 2020, and touchscreen 2030. The processor 2010 is coupled to the memory 2020 and the touchscreen 2030. The coupling in this embodiment of this application may be a communication connection, and may be in an electrical form or another form.

Further, the memory 2020 is configured to store program instructions.

The touchscreen 2030 is configured to display a user interface.

The processor 2010 is configured to invoke the program instructions stored in the memory 2020, to enable the terminal 2000 to perform steps performed by the terminal in the content translation method provided in the embodiments of this application. It should be understood that the terminal 2000 may be configured to implement the content translation method provided in the embodiments of this application. For related features, refer to the foregoing descriptions. Details are not described herein again.

In some embodiments, the foregoing displaying may be displaying by using a display. The display has a displaying function, and the display may have a touch function, or may not have a touch function. An operation on a touch display may be implemented by using a virtual button, or may be implemented by tapping the touchscreen. An operation on a non-touch display may be implemented by using a physical key.

This application provides a computer program product including instructions. When the computer program product runs on a terminal, the terminal is enabled to perform steps performed by the terminal in the content translation method provided in the embodiments of this application.

This application provides a computer-readable storage medium, including instructions. When the instructions are run on a terminal, the terminal is enabled to perform steps performed by the terminal in the content translation method provided in the embodiments of this application.

A person skilled in the art may clearly understand that the embodiments of this application may be implemented by hardware, or by hardware and software. When the embodiments are implemented by hardware and software, the foregoing functions may be stored in a computer-readable medium. Based on such an understanding, the technical solutions of the embodiments of this application essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like) or a processor to perform all or some of the steps of the method described in the embodiments of this application. The foregoing storage medium includes any medium that can store program code, such as a flash memory, a removable hard disk, a read-only memory (ROM), a random-access memory (RAM), a magnetic disk, or an optical disc.

The foregoing descriptions are merely specific implementations of the embodiments of this application, but are not intended to limit the protection scope of the embodiments of this application. Any variation or replacement within the technical scope disclosed in the embodiments of this application shall fall within the protection scope of the embodiments of this application. Therefore, the protection scope of the embodiments of this application shall be subject to the protection scope of the claims.

What is claimed is:

1. A method implemented by a terminal, wherein the method comprises:
    displaying a first user interface comprising a first translation result of first content;
    detecting a first operation on the first user interface;
    displaying, in response to the first operation, a second user interface comprising a second translation result of second content, wherein the second content is associated with the first content;
    sending, in response to the first operation, third content to a first server to translate the third content, wherein the third content is associated with the second content;
    detecting a second operation on the second user interface;
    displaying, in response to the second operation, a third user interface comprising a third translation result of the third content;
    detecting, in response to the second operation, whether the third content is end content; and
    skipping, in response to the second operation and in response to detecting that the third content is the end content, sending to-be-translated content to the first server.

2. The method of claim 1, further comprising sending, in response to the second operation and in response to detecting that the third content is not the end content, fourth content to the first server to translate the fourth content, wherein the fourth content is associated with the third content.

3. The method of claim 1, wherein the third content comprises a sequence number identifying first location information of the third content relative to other content, and wherein the method further comprises displaying the third translation result of the third content based on the sequence number.

4. The method of claim 1, wherein before displaying the first user interface, the method further comprises:
    displaying a fourth user interface comprising the first content;
    detecting a third operation on the fourth user interface; and
    sending, in response to the third operation, the first content and the second content to the first server.

5. The method of claim 4, wherein the fourth user interface is of a first application, and wherein before sending the second content to the first server, the method further comprises:
    detecting a fourth operation on the fourth user interface;
    generating, in response to the fourth operation, a scrolling instruction;
    obtaining, via the first application from the first server, fifth content corresponding to the scrolling instruction;
    receiving the fifth content from the first server; and
    generating the second content based on the fifth content.

6. The method of claim 5, wherein the scrolling instruction is for scrolling content by a length of L in a predetermined direction of a fifth user interface of the first application, wherein the predetermined direction is upward, downward, leftward, or rightward, and wherein L is greater than 80 pixels and is less than a height of a display of the terminal.

7. The method of claim 5, wherein the fifth content is in a format of a picture, wherein the method further comprises tailoring the fifth content to obtain the second content, and wherein a tailoring manner comprises at least one of:
    tailoring the fifth content by content of a first length downward from a top boundary;
    tailoring the fifth content by content of a second length upward from a bottom boundary;
    removing, from the fifth content, same content between the fifth content and the first content; or
    removing, from the fifth content, an incomplete text on the bottom boundary.

8. The method of claim 5, further comprising detecting second location information, wherein the second location information indicates a location of the second content in the fifth content.

9. The method of claim 4, wherein the fourth user interface is of a first application, and wherein the method further comprises:
    detecting a fifth operation on the fourth user interface; and
    displaying, in response to the fifth operation, the first user interface, wherein the first user interface is of a second application.

10. The method of claim 4, wherein the fourth user interface is of a first application, and wherein the method further comprises:
   detecting a fifth operation on the fourth user interface; and
   displaying, in response to the fifth operation, the first user interface, wherein the first user interface is of a second application, and wherein the first translation result displayed in the first user interface is re-typeset using the second application.

11. The method of claim 4, wherein the fourth user interface is of a first application, and wherein the method further comprises:
   detecting a fifth operation on the fourth user interface; and
   displaying, in response to the fifth operation, the first user interface, wherein the first user interface is of the first application.

12. The method of claim 4, further comprising displaying, in response to the third operation, a fifth user interface comprising a translate control, wherein the translate control triggers the terminal to send the first content and the second content.

13. The method of claim 4, wherein the third operation comprises a double-finger pressing operation and a tapping operation, and wherein the method further comprises:
   displaying, in response to the double-finger pressing operation, a sixth user interface comprising a translate control;
   detecting the tapping operation on the translate control; and
   sending the first content and the second content.

14. A terminal comprising:
   a touchscreen;
   a memory configured to store one or more programs; and
   one or more processors coupled to the touchscreen and the memory, wherein when executed by the one or more processors, the one or more programs cause the terminal to:
      display a first user interface comprising a first translation result of first content;
      detect a first operation on the first user interface;
      display, in response to the first operation, a second user interface comprising a second translation result of second content, wherein the second content is associated with the first content;
      send, in response to the first operation, third content to a first server to translate the third content, wherein the third content is associated with the second content;
      detect a second operation on the second user interface;
      display, in response to the second operation, a third user interface comprising a third translation result of the third content;
      detect, in response to the second operation, whether the third content is end content; and
      skip, in response to the second operation and in response to detecting that the third content is the end content, sending to-be-translated content to the first server.

15. The terminal of claim 14, wherein, when executed by the one or more processors, the one or more programs further cause the terminal to send, in response to the second operation and in response to detecting that the third content is not the end content, fourth content to the first server to translate the fourth content, and wherein the fourth content is associated with the third content.

16. The terminal of claim 14, wherein the third content comprises a sequence number identifying first location information of the third content relative to other content, and wherein, when executed by the one or more processors, the one or more programs further cause the terminal to display the third translation result of the third content based on the sequence number.

17. The terminal of claim 14, wherein before displaying the first user interface, when executed by the one or more processors, the one or more programs further cause the terminal to:
   display a fourth user interface comprising the first content;
   detect a third operation on the fourth user interface; and
   send, in response to the third operation, the first content and the second content to the first server.

18. The terminal of claim 17, wherein the fourth user interface is of a first application, and wherein before sending the second content to the first server, when executed by the one or more processors, the one or more programs further cause the terminal to:
   detect a fourth operation on the fourth user interface;
   generate, in response to the fourth operation, a scrolling instruction;
   obtain, from the first server, a fifth content corresponding to the scrolling instruction;
   receive the fifth content from the first server; and
   generate the second content based on the fifth content.

19. A computer program product comprising instructions that are stored on a non-transitory computer-readable storage medium and that, when executed by one or more processors, cause a terminal to:
   display a first user interface comprising a first translation result of first content;
   detect a first operation on the first user interface;
   display, in response to the first operation, a second user interface comprising a second translation result of second content, wherein the second content is associated with the first content;
   send, in response to the first operation, third content to a first server to translate the third content, wherein the third content is associated with the second content;
   detect a second operation on the second user interface;
   display, in response to the second operation, a third user interface comprising a third translation result of the third content;
   detect, in response to the second operation, whether the third content is end content; and
   skip, in response to the second operation and in response to detecting that the third content is the end content, sending to-be-translated content to the first server.

20. The computer program product of claim 19, wherein the instructions, when executed by the one or more processors, further cause the terminal to send, in response to the second operation and in response to detecting that the third content is not the end content, fourth content to the first server to translate the fourth content, wherein the fourth content is associated with the third content.

* * * * *